United States Patent [19]

Hirano et al.

[11] 4,370,744
[45] Jan. 25, 1983

[54] TIME DIVISION MULTIPLEX COMMUNICATION SYSTEM

[75] Inventors: Junzo Hirano, Zushi; Yukio Inoue, Yokohama, both of Japan

[73] Assignee: Nippon Telegraph & Telephone Public Corp., Japan

[21] Appl. No.: 125,813

[22] Filed: Feb. 28, 1980

[30] Foreign Application Priority Data

Mar. 2, 1979 [JP] Japan .................................. 54-24180

[51] Int. Cl.³ ................................................ H04J 3/02
[52] U.S. Cl. ......................................... 370/88; 370/16
[58] Field of Search ..................... 370/88, 87, 89, 86, 370/16

[56] References Cited

U.S. PATENT DOCUMENTS

| | | | |
|---|---|---|---|
| Re. 28,958 | 9/1976 | Zafiropulo et al. | 370/87 |
| 3,586,782 | 6/1971 | Thomas | 370/88 |
| 3,652,798 | 3/1972 | McNeilly et al. | 370/88 |
| 3,859,468 | 1/1975 | Smith et al. | 370/88 |
| 4,144,410 | 3/1979 | Flickinger et al. | 370/88 |

FOREIGN PATENT DOCUMENTS

| | | | |
|---|---|---|---|
| 2917675 | 11/1980 | Fed. Rep. of Germany | 370/88 |
| 1363357 | 8/1974 | United Kingdom | |
| 2054324 | 2/1981 | United Kingdom | 370/88 |

*Primary Examiner*—Douglas W. Olms
*Attorney, Agent, or Firm*—Townsend and Townsend

[57] ABSTRACT

A time division multiplex communication circuit is constituted by a set of loop shaped transmission line pairs which transmits time division multiplexed signals via a clockwise transmission line and a counterclockwise transmission line, a center office connected to starting and terminal ends of the transmission line pair, and a plurality of local offices located at intermediate points of the transmission line pair. The center office includes a device connected to the starting and terminal ends of the transmission line pair for transmitting and receiving signals therewith, and a processing means for assigning time slots of time division multiplexed channels of the transmission line pairs to signals to be sent to the transmission line pairs and for sending an interoffice signal regarding the assignment of the time slots to the local offices. Each local office includes access means for accessing the assigned time slots of the time division multiplexed signals on the transmission line pair, and control means responsive to the interoffice signal sent from the center office for controlling the access means, whereby when a communication is made between two offices belonging to the loop, the processing means of the central office assigns time slot to said offices between which communication is made for causing the access means of the local offices to operate under control of the control means so as to form with the assigned time slots two route channels, one passing through a specific point on a transmission path provided by the transmission line pair, while the other not passing through the specific point thereby performing interoffice communications through at least one of the route channels under the control of either one of the processing means of the central office and the control means of the local office.

21 Claims, 37 Drawing Figures

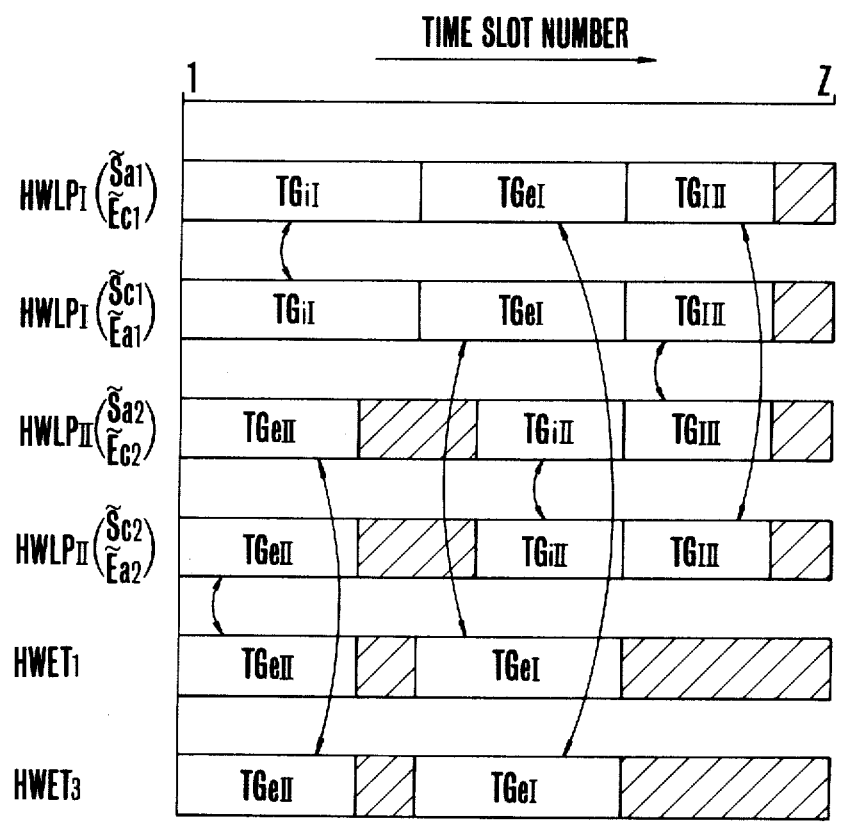
F I G.12

F I G.15
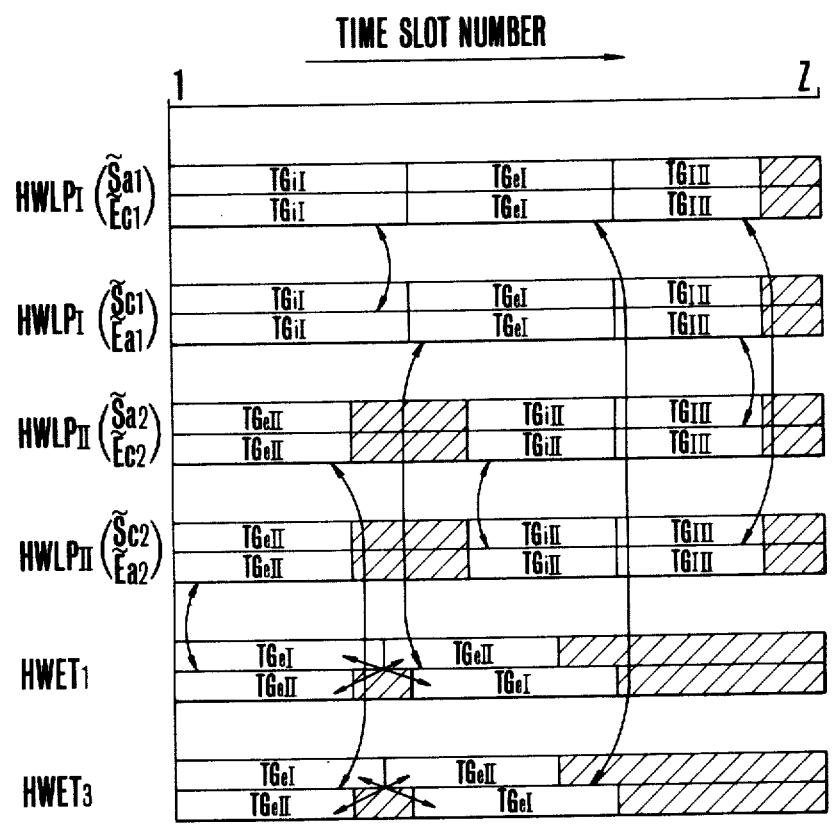

F I G. 27
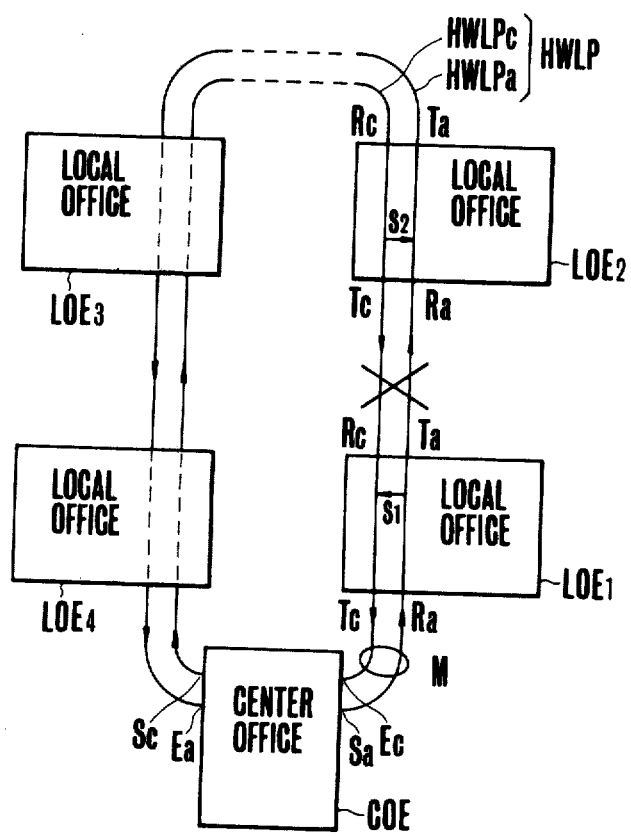

TIME DIVISION MULTIPLEX COMMUNICATION SYSTEM

BACKGROUND OF THE INVENTION

This invention relates to a time division multiplex communication system, and more particularly a time division multiplex communication system wherein a plurality of local offices distributed in a wide area and a center office controlling or supervising the local offices are interconnected by a loop transmission line pair so as to transmit time division multiplexed signals through the transmission line pair thereby enabling communication between the center office and respective local offices. In such communication system utilizing the loop transmission line pair, as the pair can be used in common by several offices, the efficiency of utilization of the line is high, so that this system is becoming important in the communication system. A typical one of such system is disclosed in Japanese Publication No. 32244/1976 titled "Electrical Communication System".

As shown in FIG. 1A of the accompanying drawing, according to the system disclosed therein, time division multiplexed signals are transmitted unidirectionally through a loop main transmission line MAIN as shown by arrows. Multiplexers $LMX_l$–$LMX_n$, which introduce and extract a pulse shaped signal into and out of a specific time slot among a plurality of time slots provide for the time division multiplexed signals that are introduced into the main transmission line. Therefore, when a communication is to be made between the multiplexers $LMX_l$ and $LMX_m$, a specific time slot $TS_a$ is used in these multiplexers to transmit a signal from the multiplexer $LMX_l$ in the counterclockwise direction and to transmit a signal from the multiplexer $LMX_m$ also in the counterclockwise direction. Thus, the transmission of signals is performed around the main transmission line MAIN, that is unidirectionally.

For this reason, when a fault occurs in the main transmission line MAIN, the communication becomes impossible. To eliminate this difficulty, an auxiliary line AUXI, which transmits signals in the opposite direction, is installed in parallel to the main transmission line MAIN as shown in FIG. 1B. When a section between the multiplexers $LMX_m$ and $LMX_n$ becomes faulty at a point indicated by X, the main transmission lina MAIN and the auxiliary transmission line AUXI are interconnected at that faulty section to resume a loop shaped transmission line thus ensuring communication.

In the system shown in FIG. 1B, however, as the auxiliary transmission line AUXI is not normally used, it is not economical from the standpoint of installation. Moreover, as the auxiliary transmission line AUXI must be installed as a unidirection transmission line as in FIG. 1A, when constructing communication lines of large capacity cost are increased further.

SUMMARY OF THE INVENTION

Accordingly, it is a principal object of this invention to provide a more reliable time division multiplex communication system capable of assuring a communication line even when a fault occurs in an office or a cable constituting the closed loop communication line.

Another object of this invention is to provide an improved time division multiplex communication system capable of increasing the system efficiency of the closed loop transmission line over the prior art.

Still another object of this invention is to provide a novel time division multiplex communication system capable of increasing the efficiency of installing a closed loop transmission line.

A further object of this invention is to provide a novel time division multiplex communication system which can readily connect a loop shaped transmission line to a line outside of the loop.

Still further object of this invention is to provide a novel time division multiplex communication system capable of more flexibly assigning a transmission line than possible with prior art systems.

Yet another object of this invention is to provide an improved time division multiplex communication system in which the maintenance, inspection and use of the line can be effected by the center office.

These and further objects can be accomplished according to this invention by providing a time division multiplex communication system, comprising a set of loop transmission line pairs which transmit time division multiplexed signals via a clockwise transmission line and a counterclockwise transmission line, a center office connected to starting ends and terminal ends of the transmission line pairs, and a plurality of local offices located at intermediate points of the transmission line pairs. The center office includes means connected to the starting and terminal ends of the transmission line pairs for transmitting and receiving signals and a processing means for assigning time slots in the time division multiplexed channels of the transmission line pairs to data signals take sent to the transmission line pairs and for sending an interoffice signal regarding the assignment of the time slots to the local offices. Each of the local offices includes means for accessing the assigned time slots of the time division multiplexed channels of the transmission line pairs and control means responsive to the interoffice signal sent from the center office for controlling the access means. Therefore when a communication is made between two offices belonging to the loop, the processing means of the central office assigns a time slot to such offices causing the access means of the local offices to operate under control of the control means of the local office so as to form with the assigned time slots two route channels, one passing through a specific point on a transmission path provided by the transmission line pairs, which the other not passing through the specific point thereby performing interoffice communications through at least one of the route circuits under the control of either one of the processing means of the central office and the central means of the local office.

BRIEF DESCRIPTION OF THE DRAWINGS

In the accompanying drawings:

FIG. 12 is a graph showing the manner of assigning time slot groups for establishing circuits with the switch matrix shown in FIG. 11 for different purposes;

FIG. 15 is a diagram showing the manner of assigning time slot groups for different purposes and the manner of converting the time slots for establishing a circuit where a time slot converter is used;

FIG. 27 is a block diagram showing a case in which a fault occurs in the transmission line pairs and FIGS. 28A and 28B are graphs showing the manner of reassigning the time slots upon occurrence of a fault

DESCRIPTION OF THE PREFERRED EMBODIMENTS

Figure 1:
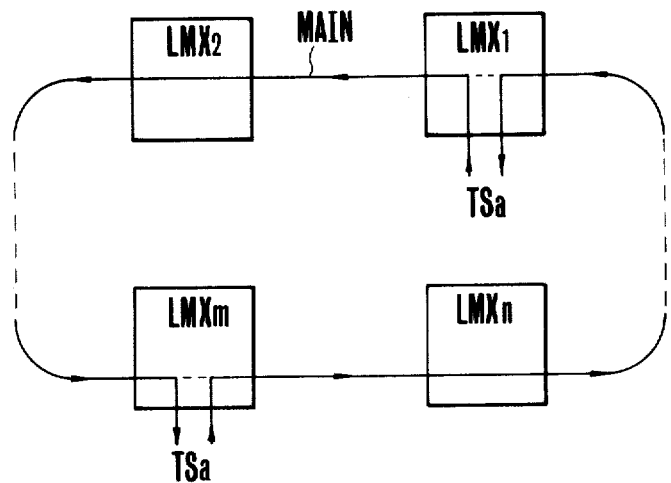
FIGS. 1A and 1B are block diagrams showing prior art systems.
Figure 1:
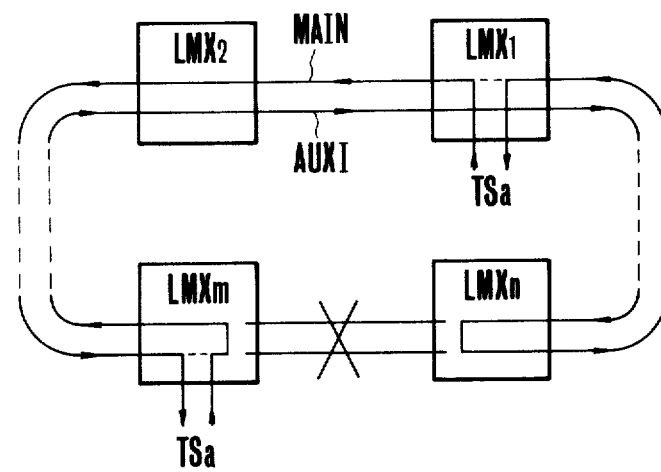
Figure 2:
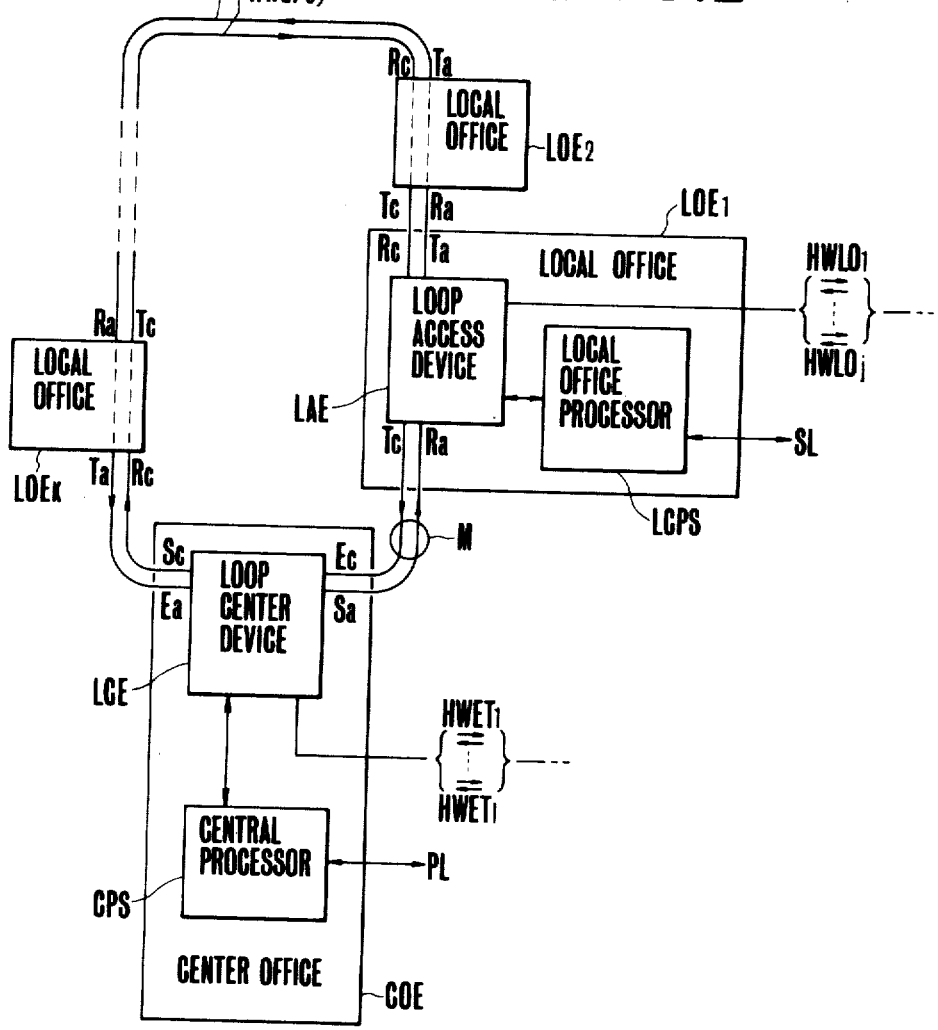
FIG. 2 is a block diagram showing the basic construction of a time division multiplex communication system embodying the invention.

Referring now to FIG. 2, the time division multiplex communication system embodying the invention includes a transmission line pair HWLP comprising a clockwise transmission line $HWLP_c$ which transmits time division multiplexed signals (hereinafter termed multiplexed signals in the clockwise direction) and a counterclockwise transmission line $HWLP_a$ which transmits the multiplexed signals in the counterclockwise direction. The starting ends $S_c$, $S_a$ and the terminating ends $E_c$, $E_a$ of these transmission lines are connected to a center office COE, and at intermediate points of the transmission line pairs HWLP are connected to a plurality of local offices $LOE_l$-$LOE_k$.

The center office COE comprises a loop center device LCE which functions as a starting and terminating device of the transmission line pair HWLP and functions to exchange multiplexed signal between the transmission line pair HWLP and external transmission lines $HWET_l$-$HWET_l$, and a central processor CPS. The central processor CPS transmits a control instruction to the loop center device LCE and assigns time slots of the transmission line pair HWLP to the required communication circuits. Each of the local offices $LOE_l$-$LOE_k$ inserted in the transmission line pair HWLP includes a loop access device LAE which introduces and extracts multiplexed signals from and to the external transmission lines $HWLO_l$-$HWLO_j$ into or out of the time slots on the transmission line pair HWLP. The local offices also include a local office processor LCPS which delivers a control instruction to the loop access device LAE. The central office processor CPS and the local office processor LCPS of each one of the local offices $LOE_l$-$LOE_k$ exchange signals in a specific time slot of the multiplexed signal on the transmission line pair HWLP. The external transmission lines $HWET_1$-$HWET_1$ and $HWLO_l$-$HWLO_j$, respectively connected to the loop center device LCE and the access control device LAE, are also connected to telephone exchange switches or the like corresponding to the center office COE and the local offices $LOE_l$-$LOE_k$. The telephone exchange switches corresponding to the center office COE are connected to the central office processor CPS through a signal line PL whereas the telephone exchange switches and the local office processor LCPS corresponding to each one of the local offices $LOE_l$-$LOE_k$ are interconnected through a signal line SL to exchange a connection call, demand signal or a like signal.

Figure 3:
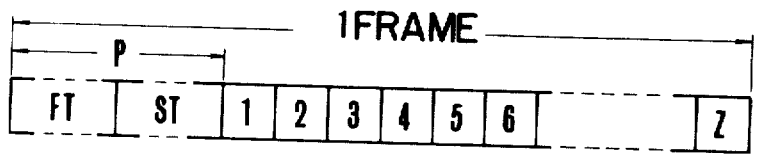
FIG. 3 shows an array of the time slots utilized in the system shown in FIG. 2.

FIG. 3 shows the frame construction of multiplexed signals transmitted through the transmission line pair HWLP in which FT shows frame time slots for a frame synchronizing signal, ST signal time slots utilized to transmit signals between the central office processor CPS and the local office processor LCPS, the sum of said time slots FT and ST comprising P time slots (where P is an integer), and 1 through Z show time slots utilized to transmit digital data signals. (Z+P) time slots constitute one frame. Furthermore, each time slot is constituted by a plurality of bits (in the case of a telephone system, one time slot is generally constituted by 8 bits), and a circuit is established by utilizing this one time slot as a unit.

Figure 4:
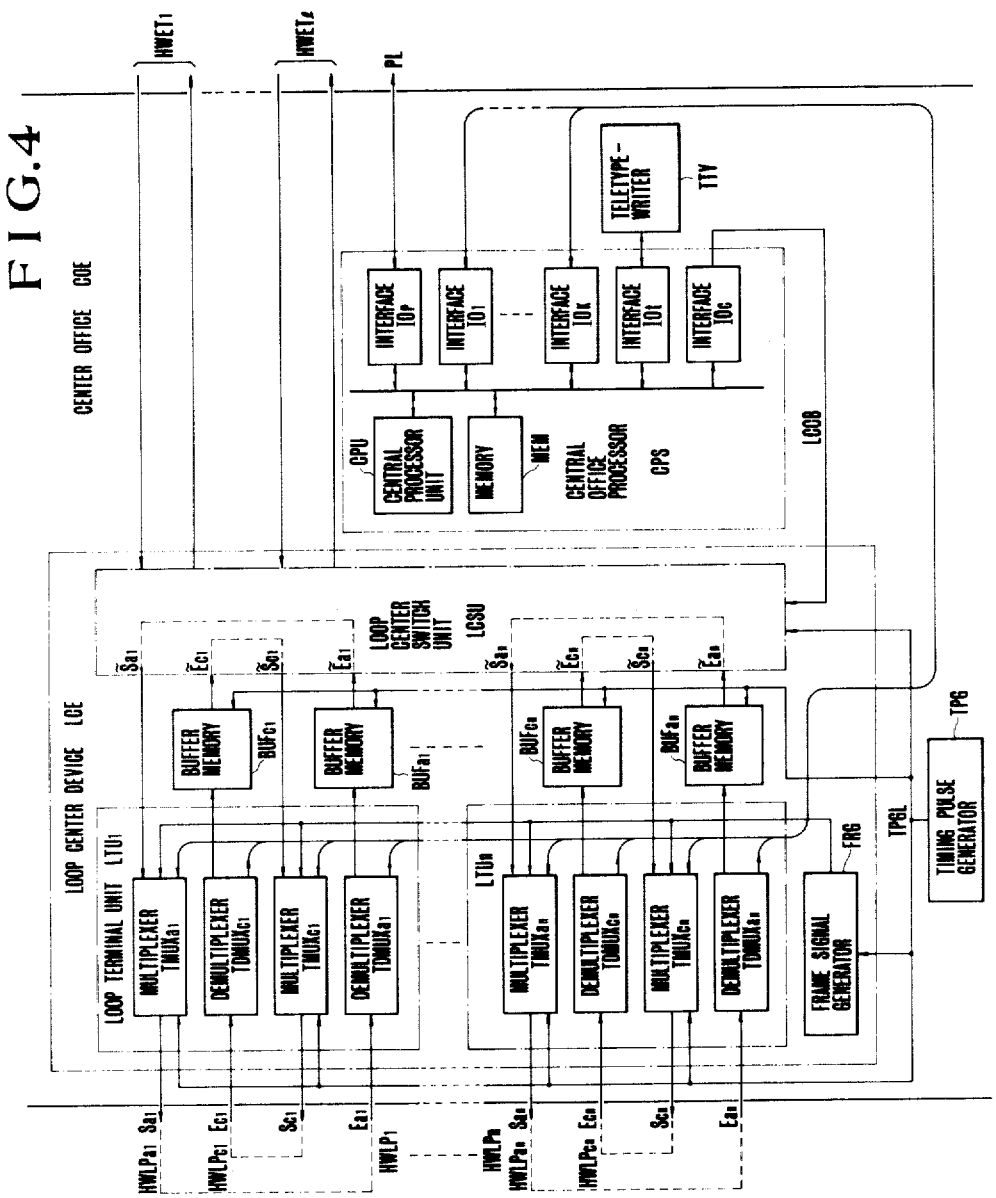
FIG. 4 is a block diagram showing the detail of one example of the center office shown in FIG. 2.

FIG. 4 shows the detail of the center office COE, which utilizes a plurality of transmission line pairs $HWLP_1$-$HWLP_n$.

A timing pulse generator TPG is provided to divide the frequency of a signal supplied thereto from a reference clock oscillator, not shown, for producing time slot timing signals which are used to operate a (Z+P) step counter, not shown, and for generating a timing slot number designation signal as well as various other timing pulses.

There is also provided a frame signal generator FRG which produces, in synchronism with the timing signal from the timing pulse generator TPG, a pulse pattern for a frame synchronizing signal, the pulse pattern being delivered to multiplexers $TMUX_{a1}$-$TMUX_{cm}$.

Loop terminal units $LTU_1$-$LTU_n$ are provided for each one of the transmission line pairs $HWLP_1$-$HWLP_n$ and each terminal unit is constituted by multiplexers $TMUX_{a1}$-$TMUX_{cm}$, and $TMUX_{c1}$-$TMUX_{cn}$, demultiplexers $TDMUX_{c1}$-$TDMUX_{cm}$, and $TDMUX_{a1}$-$TDMUX_{an}$. For example, the loop terminal end unit $LTU_1$ is constituted by the multiplexer $TMUX_{a1}$ and $TMUX_{cl}$ and demultiplexers $TDMUX_{a1}$ and $TDMUX_{c1}$. The multiplexers $TMUX_{a1}$-$TMUX_{an}$ and $TMUX_{c1}$-$TMUX_{cn}$ introduce the frame synchronizing signal generated by the frame signal generator FRG into the frame time slot FT, shown in FIG. 3, in the multiplexed signals sent from the loop center switch unit LCSU to terminal end units $LTU_1$-$LTU_n$ of respective loops; they also introduce into the signal time slot ST a control signal to respective local office processors LCPS. The control signal is supplied by the central office processor CPS. In response to the signal time slot ST in the received multiplexed signals, the demultiplexers $TDMUX_{c1}$-$TDMUX_{cn}$ and $TDMUX_{a1}$-$TDMUX_{an}$ extract control signals transmitted from respective local office processors LCPS and to send the signals extracted to the central office processor CPS. In addition, these demultiplexers extract data signals transmitted by other time slots $1-Z$ and send the extracted data to buffer memory devices $BUF_{c1}$-$BUF_{cn}$ and $BUF_{a1}$-$BUF_{an}$, respectively.

These buffer memory devices $BUF_{c1}$-$BUF_{cn}$ and $BUF_{a1}$-$BUF_{an}$ synchronize the data signals from the demultiplexers $TDMUX_{c1}$-$TDMUX_{cn}$ and $TDMUX_{a1}$-$DTMUX_{an}$ with a local frame synchronizing signal to temporarily store the data signals from the demultiplexers $TDMUX_{c1}$-$TDMUX_{cn}$ and $TDMUX_{a1}$-$TDMUX_{an}$ and then read out these stored data signals in synchronism with the local frame synchronizing or time slot timing signal supplied from the timing pulse generator. The read out data is then sent to the loop center switch unit LCSU.

The loop center switch unit LCSU contains a switch matrix and a time slot converter, to be described later. The output terminals $\tilde{S}_{a1}$-$\tilde{S}_{an}$ and $\tilde{S}_{c1}$-$\tilde{S}_{cn}$ of the loop center switch unit LCSU are respectively connected to the multiplexers $TMUX_{a1}$-$TMUX_{an}$ and $TMUX_{c1}$-$TMUX_{cn}$ whereas the input terminals $E_{c1}$-$E_{cn}$ and $E_{a1}$-$E_{an}$ are respectively connected to demultiplexers $TDMUX_{c1}$-$TDMUX_{cn}$ and $TDMUX_{a1}$-$TDMUX_{an}$. The data signals utilized for communication are interconnected by the switch matrix (to be described later) in the loop center switch unit LCSU such that the data signals are transmitted by utilizing the output/input terminals $\tilde{S}_{a1}$ and $\tilde{E}_{c1}$, and $\tilde{S}_{c1}$ and $\tilde{E}_{a1}$ as pairs. The switch matrix in the loop center switch unit LCSU connects output/input terminals $\tilde{S}_{a1}$, $\tilde{E}_{c1}$-$\tilde{S}_{cn}$ and $\tilde{E}_{an}$ and/or connects these output/input terminals and the external transmission lines $HWET_1$-$HWET_l$ in accordance with a control instruction from the central office processor CPS.

In addition, the central office processor CPS is constituted by a central processor unit CPU, for example a microprocessor, a memory device MEM, and interfaces $IO_p$, $IO_1$-$IO_k$, $IO_t$ and $IO_c$ for exchanging control signals by using a signal bus LCCB via interface $IO_c$ between the central office processor and the loop center switch unit LCSU. Respective interfaces $IO_1$-$IO_k$ are connected to local office processors LCPS in local offices $LOE_1$-$LOE_k$ respectively via multiplexers $TMUX_{a1}$-$TMUX_{an}$ and $TMUX_{c1}$-$TMUX_{cn}$ and demultiplexers $TDMUX_{c1}$-$TDMUX_{cn}$ and $TDMUX_{a1}$-$TDMUX_{an}$ and through signal channels constituted by the signal time slot ST. Consequently, the connection request signals from telephone exchange in or near respective local offices $LOE_1$-$LOE_k$ are supplied to the central processor unit CPU by the interfaces $IO_1$-$IO_k$ via local office processors LCPS. The connection request signal from the telephone exchange in or near the center office COE is applied to the central processor unit CPU by the interface $IO_p$ via the signal line PL. In response to the connection request signal, the central processor unit CPU determines the time slot to be assigned and the route designation according to the flow chart, to be described later, by checking the content of the memory device MEM. The CPU sends the result to the local office processors LCPU of the office which sent the connection call demand and the called local office via interfaces $IO_1$-$IO_k$. At the same time, a control instruction for the loop center switch unit LCSU is also sent out through the interface $IO_c$.

Further, the central office processors CPS are provided with a teletypewriter TTY to enable input and output of various data, such as programs, via the interface $IO_k$.

Figure 5:
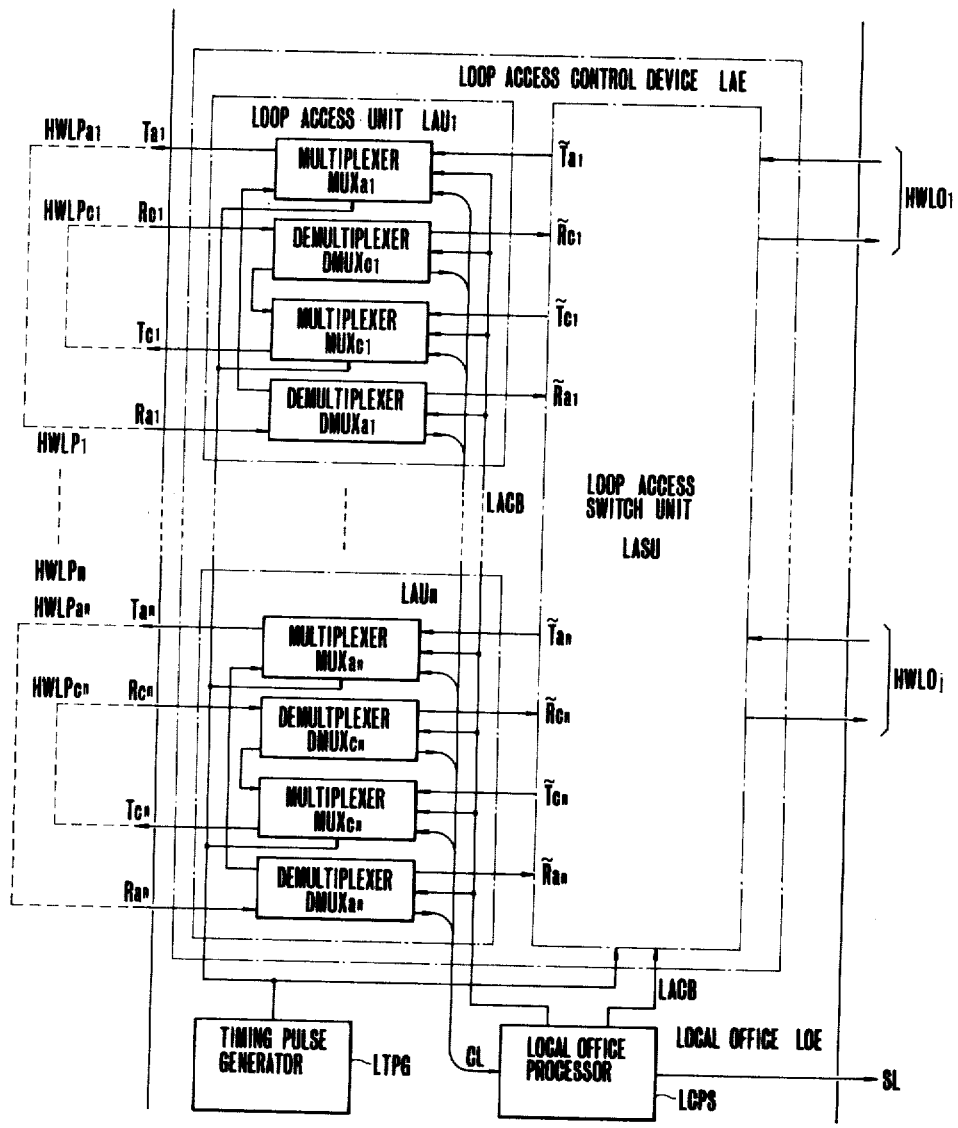
FIG. 5 is a block diagram showing one example of the local office shown in FIG. 2.

FIG. 5 shows the construction of a local office LOE in which, similar to FIG. 4, a plurality of transmission line pairs $HWLP_1$-$HWLP_n$ are utilized.

A timing pulse generator LTPG shown in FIG. 5 generates a time slot timing signal, and various other timing pulses, in the same manner as the timing pulse generator TPG in the center office COE.

The loop access unit LAU is provided for each transmission line pair HWLP and is constituted by multiplexers $MUX_{a1}$-$MUX_{an}$ and $MUX_{c1}$-$MUX_{cn}$ and demultiplexers $DMUX_{c1}$-$DMUX_{cn}$ and $DUX_{a1}$-$DUX_{an}$. These multiplexers introduce data signals from the loop access switch unit LASU into the time slots designated on the transmission line pairs $HWLP_1$-$HWLP_n$. The multiplexers also introduce into the signal time slot ST, shown in FIG. 3, a signal sent from the local office processor LCPS to the central office processor CPS. Each of the demultiplexers $DMUX_{c1}$-$DMUX_{cn}$ and $DMUX_{a1}$-$DMUX_{an}$ extracts data signals in the time slot designated on one of the transmission channel pairs $HWLP_1$-$HWLP_n$ so as to send the extracted data signals to the loop access switch unit LASU. Each of the demultiplexers also extracts a signal from the signal time slot and sends the signal from the central office processor CPS to the local office processor thereby accessing the data signal on the transmission line pair HWLP for a time slot designated by these operations.

The time slot number which is allowed to access the data signal on the transmission line pairs $HWLP_1$-$HWLP_n$ is designated by the local office processor LCPS via a signal line LACB, whereas the data signals on the time slots not designated pass through the loop access unit LAU.

At the loop access switch unit LASU a switch matrix and a time slot converter, to be described later, are used. The output terminals $\tilde{T}_{a1}$-$\tilde{T}_{an}$ and $\tilde{T}_{c1}$-$\tilde{T}_{cn}$ of the loop access switch unit LASU are respectively connected to multiplexers $MUX_{a1}$-$MUX_{an}$ and $MUX_{c1}$-$MUX_{cn}$, and the input terminals $R_{c1}$-$R_{cn}$ and $R_{a1}$-$R_{an}$ are respectively connected to demultiplexers $DMUX_{c1}$-$DMUX_{cn}$ and $DMUX_{a1}$–$DMUX_{an}$ to transmit the transmitting and receiving siganls of the switch matrix using output/input terminals $T_{a1}$, $R_{c1}$ and $T_{c1}$, $R_{a1}$ as pairs. Furthermore, the loop access switch unit LASU is constructed to interconnect the output/input terminals $T_{a1}$, $R_{c1}$–$T_{cn}$, $R_{an}$ and the external transmission lines $HWLO_1$–$HWLO_j$ in accordance with a control instruction from the local office processor LCPS.

The local office processor LCPS is similar to the central office processor CPS in the center office COE and sends out a connection request signal over the signal line CL to receive a time slot assignment instruction. Thus, the local office processor designates a time slot, assigned to it according to the time slot assignment instruction, for the loop access unit LAU. The transmission and reception of a connection request signal to and from a telephone switch in a local office are made via the signal line SL whereby the local office processor LCPS delivers a control signal to the loop access switch unit LASU.

The procedure for assigning time slots and designating a route for the connection call demand performed by the central office processor will be described below.

However, to simplify the description it is assumed that, in the loop center switch unit LCSU shown in FIG. 4, the data signal from the demultiplexer $TDMUX_{a1}$ is normally applied to the multiplexer $TMUX_{a1}$, and that the data signal from the demultiplexer $TDMUX_{c1}$ is applied to the multiplexer $TMUX_{c1}$. As a consequence, the data signals from the respective local offices pass straight through the center office COE. Therefore, only the case wherein the connection request occurs between local offices connected with the transmission line pair will be described.

Before describing the flow chart regarding the time slot assignment procedure, some fundamental items will be discussed. However, for the sake of simplicity it is assumed now that the construction shown in FIG. 2 is used, and that the transmission line pair HWLP shown in FIG. 2 is connected as $HWLP_1$ shown in FIG. 4.

(1) A time slot group for the data signal on the transmission line pair HWLP is used in common by the local offices $LOE_1$–$LOE_k$.

(2) In accordance with one time slot assigned to a connection request from an office, two circuits are established between the calling office and the called office. More particularly, it is assumed that a connection request exists between local office $LOE_1$ and $LOE_2$ shown in FIG. 2, and when No. 10 time slot is assigned, a bidirectional channel utilizing the No. 10 time slot would be established between the sending and receiving terminals $T_a$–$R_c$ of the local office $LOE_1$ and the receiving and sending terminal $R_a$–$T_c$ of the local office $LOE_2$. Also at the same time, a bidirectional channel utilizing the same No. 10 time slot is established through the center office LOE between the sending and receiving terminals $T_c$–$R_a$ of the local office $LOE_1$ and the receiving and sending terminals $R_c$–$T_a$ of the local office $LOE_2$. Thus, two channels are established corresponding to this time slot. In order to discriminate these two channels, an arbitrarily selected point on the transmission route is designated as an M point, and the channel passing through this M point is designated as an M route circuit. The channel that does not pass through the M point is designated as an N route channel. Thus, in the example shown in FIG. 2 a specific point between the center office COE and the local office $LOE_1$ is designated as the M point.

(3) Only one assigned time slot is used between the same two offices.

(4) Although two channels are established upon assignment of one time slot, the channel not utilized for transmitting data signals is designated as an idle channel.

(5) A time slot not yet assigned to any local office is designated as an idle or vacant time slot.

Figure 6:
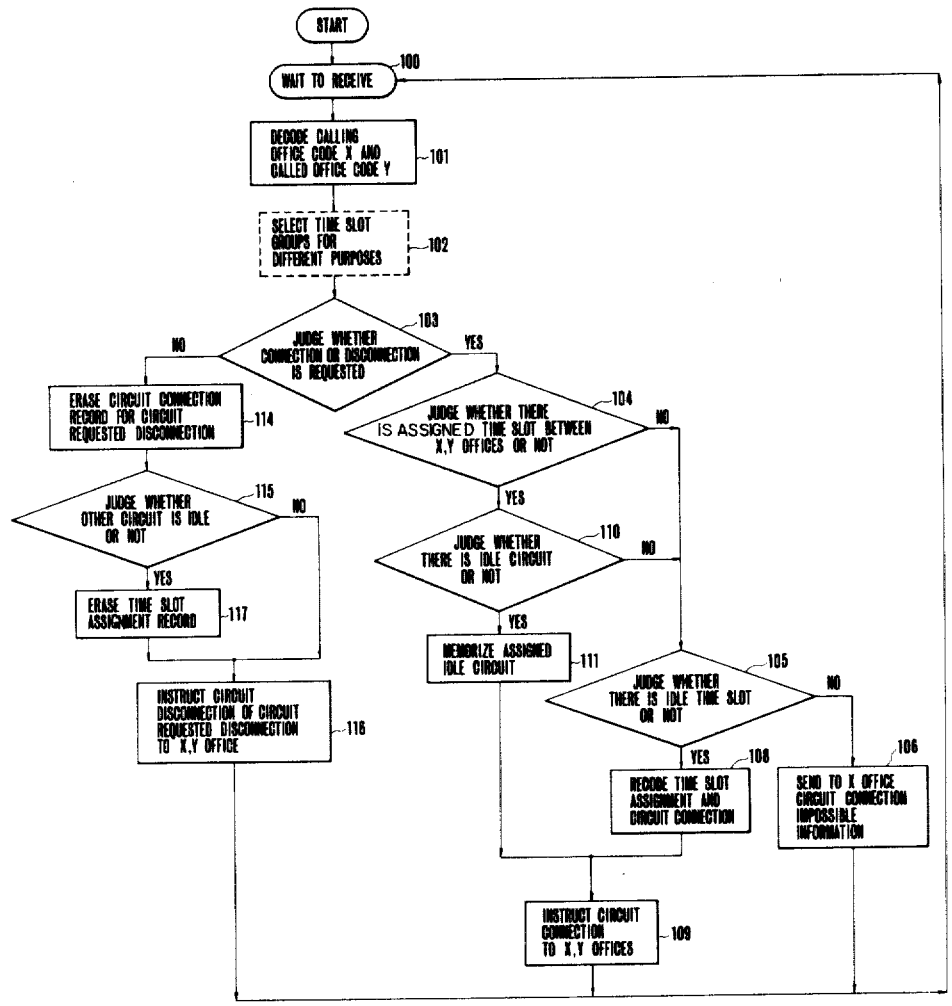
FIG. 6 is a flow chart showing the steps of assigning time slots.

FIG. 6 is a flow chart showing the procedure of assigning time slot by the central office processor CPS. More particularly:

(A) The central office processor CPU is normally in a waiting state at step 100 be prepared to receive signals from telephone exchanges in or near the local offices $LOE_1$–$LOE_k$ and from the telephone exchange in or near the center office.

(B) Upon receival of a connection request of a data signal at step 101, a code X of a calling office that has transmitted a connection request of a data signal and a code Y of a called office are decoded according to the received signal.

(C) In the next step different time slot groups are selected for different purposes. A particular time slot group is selected at step 102 according to codes X and Y.

(D) Whether the data signal is requesting connection or disconnection of a circuit already established is judged in accordance with the received signal at step 103.

(E) When the request is a connection (YES), the program is advanced to step 104 to make a judgement as to whether there are already assigned time slots between X and Y offices or not by referring to the content of the memory device MEM.

(F) If the result of judgement at item E is NO (no assigned time slots), the program is advanced to step 105 to decide whether there is an idle time slot or not.

(G) If the result of judgement at step 105 is NO, it is impossible to establish a circuit so that the program is advanced to step 106. An "it is impossible to establish a circuit" message is sent back to calling office X that has requested connection.

(H) When the result of judgement at step 105 is YES, the step is advanced to program 108 so that a "time slot assignment" is made for one of the idle time slots. Either one of the M or N route channels is selected thus storing "circuit establishment" information in the memory device MEM.

(I) At step 109 information regarding an idle time slot number and the route channel selected according to item H are sent to the X and Y offices to cause them to deliver a "circuit establishing instruction".

(J) When the result of judgement at step 104 is YES, i.e., there are already assigned time slots between X and Y offices, at the next step 110 a judgement is made as to whether there is an idle circuit or not.

(K) When the result of judgement at step 110 is NO, the program is advanced to step 105.

(L) When the result of judgement at step 110 is YES, at the next step 111 an idle circuit is assigned to the connection request and memorizes the "idle circuit assignment" in the memory device MEM.

(M) After the memorizing at step 111, the program is transferred to step 109 described in item I.

(N) When the result of judgement at step 103 is NO, the program is advanced to step 114 wherein a record of the circuit requested to be disconnected is selected from the memory device MEM, thus performing "circuit establishment record erasure".

(O) After erasing the record, the program is advanced to step 115 at which a judgement is made as to whether the other circuit (which forms a pair together with the erased circuit) is idle or not.

(P) When the result of judgement at step 115 is NO, the program is advanced to the next step 116 at which a "line disconnection instruction" is sent to the X and Y offices, one of which has requested disconnection.

(Q) When the result of judgement at step 115 is YES, at the next step 117 a time slot assignment record erasure is made to the circuit which has requested disconnection. In other words, this time slot would be registered in the memory device MEM as an idle time slot.

(R) After erasing the record at step 117, the program is transferred to step 116.

The flow chart shown in FIG. 6 may be modified such that the judgement at step 110 as to whether there is an idle circuit or not can be made by the local office processor of a calling office X by referring to the memory device thereof. As a consequence, where there is an idle circuit for a calling office X it can be selected and the result is transmitted to the called office via the central office processoor CPS, thus sending out a connection request signal only when there is no idle circuit.

With respect to such a process, it should be noted that a number of time slots can be preassigned as a time slot group to the X and Y offices for communications between the X and Y offices alone. Then the X or Y offices selects idle channels or idle time slots among the time slot group preassigned, and the result is transmitted to the called office. In this case the function that assigns a channel for each call demand is transferred from the central office processor to the local office processors. The similar process described above is followed.

The process of assigning time slots will be described in detail with reference to FIG. 2.

For the sake of simplifying the description, it is assumed that the number of the local offices is three, i.e., $LOE_1$, $LOE_2$ and $LOE_3$, that the connection request of the data signal is limited to the connections among these three offices, and that the number of time slots usable for intercommunication among these local offices is m.

Figure 7:
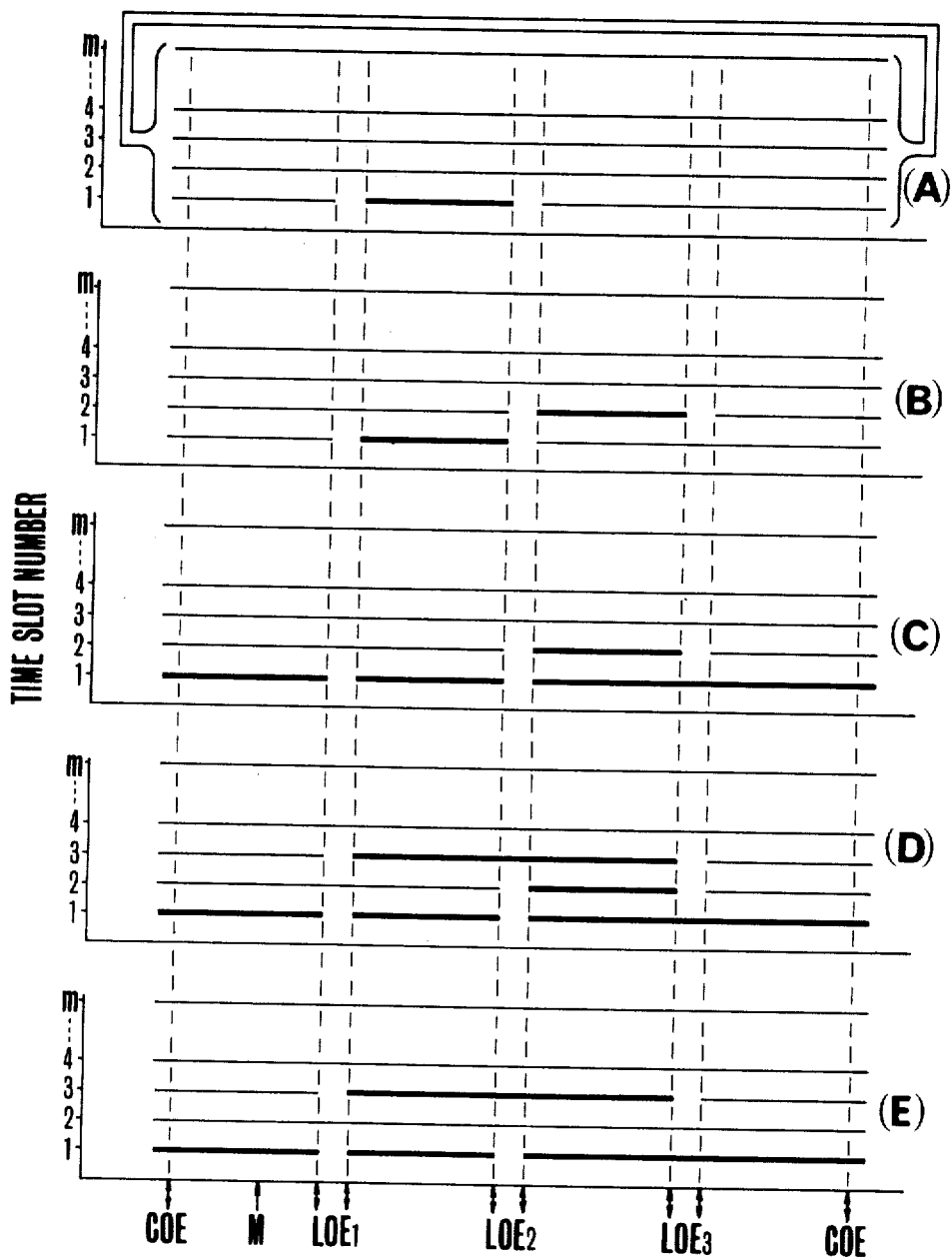
FIGS. 7A through 7E are graphs showing the manner of assigning time slots.

In FIG. 7, each fine line represents a time slot which bidirectionally transmits a data signal, and each thick line represents a circuit established for transmitting the data signal.

FIG. 7A shows a state wherein, in response to a first connection request sent from local office $LOE_1$, to local office $LOE_2$, the central office processor unit CPU has assigned No. 1 time slot and a channel of the N route has been established between local offices $LOE_1$ and $LOE_2$. More particularly, according to the flow chart shown in FIG. 6 it is decoded that the calling office is $LOE_1$ at step 101 and that the called office is $LOE_2$.

At step 103, it is considered that the result of judgement regarding the connection request is YES; at step 114 the result of judgement regarding the presence of already assigned time slot between X and Y offices is NO; at step 105 the result of judgement regarding presence of an idle time slot is YES. As a consequence, No. 1 time slot is assigned and the aforementioned N route channel is selected and recorded in the memory device MEM; at the same time an N route channel establish instruction is sent to the local offices $LOE_1$ and $LOE_2$ from the No.2 time slot, thus establishing a circuit between these local offices.

FIG. 7B shows a state wherein a connection request is made from local office $LOE_3$ to $LOE_2$ and an N route channel has been established by the No. 2 time slot as a result of the processing according to the flow chart shown in FIG. 6. It is to be noted that an idle channel of the No. 1 time slot is not being used between the local offices $LOE_3$ and $LOE_2$, even though it may be possible to establish a circuit by utilizing this idle channel. When the circuit has been established in this manner, there is a difficulty in that the blocking percentage of connection varies greatly depending on the state of assignment of channels. More particularly, when there is a busy office adjacent to the calling office or a called office, or when many local offices exist between the calling office and the called office, the probability for being unable to establish the circuit increases greatly. On the other hand, when one time slot is assigned for use only between the calling office and the called office according to the flow chart shown in FIG. 6, as two circuits are established uniformly, it becomes possible to maintain small the difference between the services of respective local offices and to use the channel at high utilization factor by using the same time slot group in common.

FIGS. 7C and 7D show the result of processing according to the flow chart shown in FIG. 6 in which connection request is made from local office $LOE_2$ to $LOE_1$ (FIG. 7C) and from local office $LOE_3$ to $LOE_1$ (FIG. 7D). More particularly, in the case shown in FIG. 7C, in response to the connection request from local office $LOE_2$ to $LOE_1$ an M route channel has been established by No. 1 time slot, whereas in the case shown in FIG. 7D, an N route channel has been established between local offices $LOE_3$ and $LOE_1$ by No. 3 time slot.

FIG. 7E shows a state in which the communication between the local offices $LOE_2$ and $LOE_3$ interconnected under the state shown in FIG. 7B has terminated and the circuit has been disconnected. Thus, according to the flow chart in FIG. 6, at step 114 the central office processor unit CPU has erased the circuit connection record for a circuit requesting disconnection and then at step 115 a judgement is executed as to whether the other circuit is idle or not.

The result of the judgement is YES because the M route channel established by No. 2 time slot is idle. Accordingly, the time slot assignment record is erased and this time slot is registered in the memory device MEM as an idle time slot.

Above description relates to a case in which the generation of connection request by the data signal is limited to the interconnection between the local offices $LOE_1$–$LOE_3$ along the transmission line pair HWLP. Let us now describe a case wherein connection is established between telephone exchange switches in or near the local offices $LOE_1$–$LOE_3$ along in the transmission line pair HWLP and the telephone exchange switches connected to the external transmission lines $HWET_1$–$HWET_l$ of the center office COE, that is those on the outside of the transmission on line pair HWLP. However, for the sake of brevity, the external transmission lines $HWET_1$ and $HWET_2$ are taken as examples.

Figure 8:
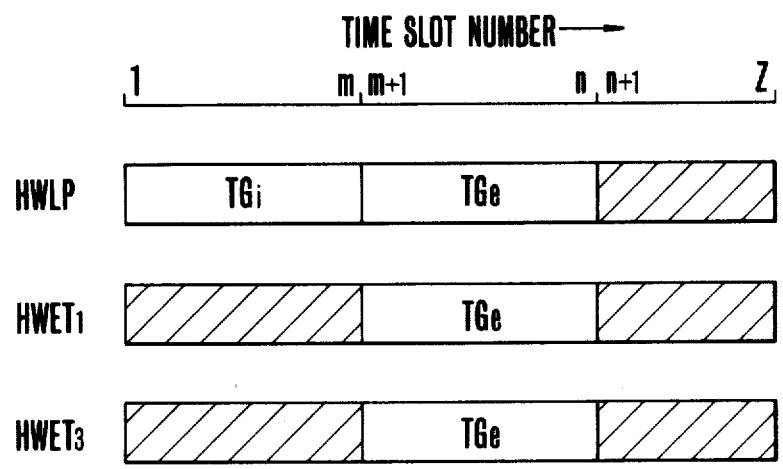
FIG. 8 is a graph showing the manner of dividing the time slots into groups.

As shown in FIG. 8, the time slots of the multiplexed signals on the transmission line pair HWLP and the external transmission lines $HWET_1$ and $HWET_2$ are divided such that No. 1 to m time slots correspond to a time slot group $TG_i$ (hereinafter called a different purpose time slot group), which is used in common for communicating among local offices $LOE_1$–$LOE_k$.

No.(m+1) to No. n time slots correspond to a time slot group $TG_e$ which is used in common for communicating between the local offices $LOE_1$-$LOE_k$ and the telephone exchange switches in or near the center office. In the loop center switch unit LCSU shown in FIG. 4, when the transmission line pair HWLP is connected as the communication line $HWLP_1$, the switches at corresponding cross points operate such that, for different purpose time slot group $TG_i$, input terminal $\widetilde{E}_{a1}$ and output terminal $\widetilde{S}_{a1}$ and input terminal $\widetilde{E}_{c1}$ and output terminal $S_{c1}$ are interconnected respectively, for the other different purpose slot group $TG_e$, input terminal $\widetilde{E}_{c1}$ and output terminal $\widetilde{S}_{a1}$ are connected to the external transmission line $HWET_1$, whereas input terminal $\widetilde{E}_{a1}$ and output terminal $\widetilde{S}_{c1}$ are connected to the external transmission line $HWET_3$. When the different purpose time slot groups are assigned and when the loop center switch unit LCSU is operated in a manner as described above, communication among local offices $LOE_1$-$LOE_k$ along the transmission line pair HWLP is made by using the different purpose time slot group $TG_i$; communication between the local offices $LOE_1$-$LOE_k$ and the telephone exchange switch in or near the center office COE is made by using the different purpose time slot group $TG_e$ thereby establishing a circuit according to the flow chart shown in FIG. 6.

For additional purposes other than the above, the signal may obviously be separated in compliance with various services, for example, separation between the external transmission line and looping signals and separation of transmission and reception signals for individual local offices.

Figure 9A:
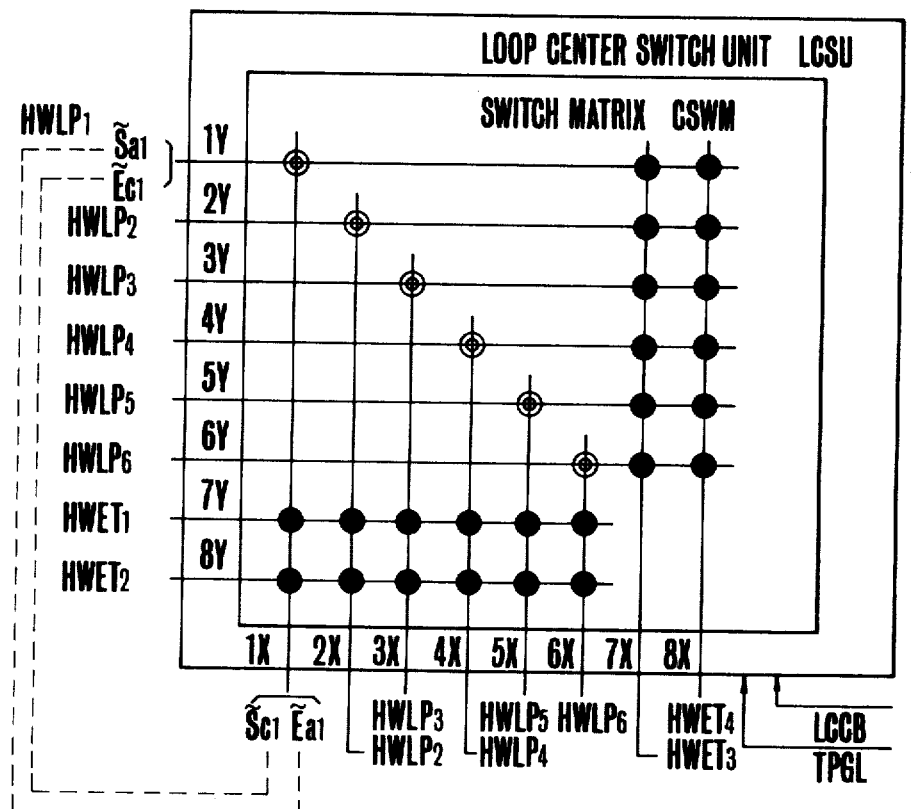
FIG. 9A shows a basic connection of a switch matrix contained in a loop center switch unit of the center office.

FIG. 9A illustrates the construction of the loop center switch unit LCSU. It is capable of establishing circuits with the different purpose time slot groups $TG_i$ and $TG_e$ in which a matrix switch CSWM, shown in FIG. 9A, is used as the loop center switch unit LCSU. In this example, the loop is constructed to accommodate 6 systems of the transmission line pairs $HWLP_1$-$HWLP_6$, and four systems of the external transmission lines $HWET_1$-$HWET_4$. For brevity, bus lines for bidirectionally transmitting data signals are represented by simple lines. The switch at each cross point shown by a small circle is constituted by a hold memory device HM and AND gate circuits $G_1$ and $G_2$ which are enabled and disabled for bidirectional signals by a control signal, produced by the hold memory device HM as shown in FIG. 9B, and will be described later.

The switch matrix CSWM is constituted by Y axis bus lines 1Y–8Y and X axis bus lines 1 X–8X. The Y axis bus line 1Y is connected to a pair of output terminal $\widetilde{S}_{a1}$ and input terminal $\widetilde{E}_{c1}$ of the loop center switch unit LCSU and respectively lead to the starting terminal $\widetilde{S}_{a1}$ of the counterclockwise transmission line $HWLP_{a1}$ of the transmission line pair $HWLP_1$ and to the end terminal $\widetilde{E}_{c1}$ of the clockwise transmission line $HWLP_{c1}$ of the same pair $HWLP_1$. In the same manner, the X axis bus line 1X is connected to a pair of output terminal $\widetilde{S}_{c1}$ and input terminal $\widetilde{E}_{a1}$ of the loop center switch unit LCSU and lead to the starting terminal $S_{c1}$ of the clockwise transmission line $HWLP_{c1}$ of the transmission line pair $HWLP_1$ and to the end terminal $\widetilde{E}_{a1}$ of the counterclockwise transmission line $HWLP_{a1}$. The external transmission lines $HWET_1$-$HWET_4$ are divided into two groups each being connected to Y axis bus lines 7Y and 8Y and X axis bus lines 7X and 8X respectively. Transmission line pairs $HWLP_2$-$HWLP_6$ are connected in the same manner as the transmission line pair $HWLP_1$.

Switches represented by double small circles are disposed at cross points between Y axis bus lines 1Y–6Y corresponding to identical bus lines in the transmission line pairs $HWLP_1$-$HWLP_6$ and X axis bus lines 1X–6X. Switches represented by black circles are located at cross points between Y axis bus lines 7Y and 8Y connected to the external transmission lines $HWET_1$ and $HWET_2$ respectively, and X axis bus lines 1X–6X respectively connected to the transmission line pairs $HWLP_1$-$HWLP_6$ and also at the cross points between X axis bus lines 7X and 8X connected to the external transmission lines $HWET_3$ and $HWET_4$ respectively and Y axis bus bars 1Y–6Y respectively connected to the transmission line pairs $HWLP_1$-$HWLP_6$.

Figure 9B:
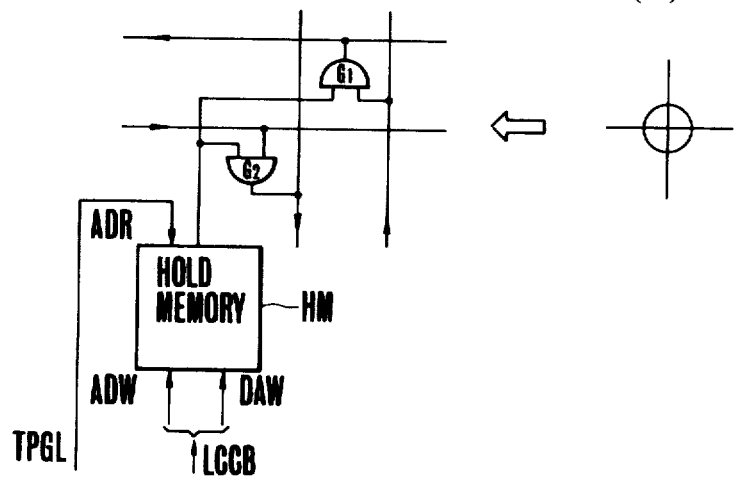
FIG. 9B show the detail of the connection of the switches provided at each cross point shown in FIG. 9A.

As above described, each switch is constructed as shown in FIG. 9B. As the hold memory device HM is used, a random access memory (RAM) stores ON/OFF information for respective addresses by addressing the time slot number of the mutliplexed signal. Thus, the time slot number designation signal from the timing pulse generator TPG of the center office COE is read out through the signal line TPGL, and the read out signal is applied to an address terminal ADW to read out the content of the hold memory device HM, whereby the switches are turned ON and OFF corresponding to respective time slots. Changes in the time slots causing ON/OFF of the switches can be made by applying to the address terminal ADW of the hold memory device HM the number of the time slot to be changed and by applying an ON/OFF signal to a data input terminal DAW of the hold memory device.

Consequently, in order to interconnect different purpose time slot groups $TG_i$ and $TG_e$ (shown in FIG. 8) between respective transmission lines, switches represented by double small circles (1Y, 1X) are closed from time slots No. 1 to No. m, and switches represented by black circles (1Y, 7X) are closed from time slot No.(m+1) to No. n.

Although FIG. 8 shows a case wherein the local offices $LOE_1$-$LOE_k$ utilize different purpose time slot groups $TG_i$ and $TG_e$, it is possible to assign the time slot groups to any desired purpose. For example local offices belonging to different transmission line pairs, can be connected or local offices $LOE_1$-$LOE_k$ and one or all local offices belonging to different transmission line pairs can likewise be interconnected. By assigning different purpose time slot groups in a manner described above, it becomes unnecessary to update the ON/OFF information regarding respective switches, stored in the hold memory device HM of the switch matrix, each time a connection request for the data signal is made, as has been described with reference to FIGS. 9A and 9B. This greatly decreases the burden of the central office processor CPS.

Figure 10:
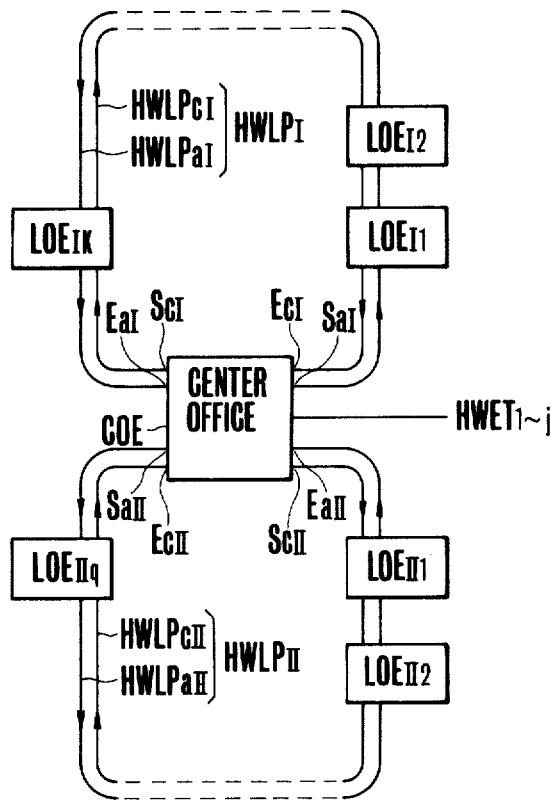
FIG. 10 is a block diagram showing a modification of the system shown in FIG. 2.

FIG. 10 shows a preferred embodiment of the system shown in FIG. 2, useful when the number of the local offices is large, or when the local offices are distributed over a wide area. In the embodiment shown in FIG. 10, the local offices $LOE_1$-$LOE_k$ are divided into two groups I and II. The local offices $LOE_{I1}$-$LOE_{Ik}$ belong to the first group I and are inserted in the first transmission line pair $HWLP_I$. The local offices $LOE_{II1}$-$LOE_{II9}$ belong to the second group II and are inserted into the second transmission line pair HWLP II. The start and end terminals $S_{cI}$, $S_{aI}$, $E_{aI}$, $E_{cI}$ and $S_{cII}$, $S_{aII}$ and $E_{aII}$ and $E_{cII}$ of the transmission line pairs $HWLP_I$ and $HWLP_{II}$ are connected to the loop center device LCE of the common center office COE. It will be understood that the local offices LOE can be divided into many more groups and inserted into respective transmission line pairs HWLP for commonly utilizing the center office COE. Also, the first and second transmission line pairs $HWLP_I$ and $HWLP_{II}$ may be constituted by transmission lines of a plurality of systems.

Figure 11:
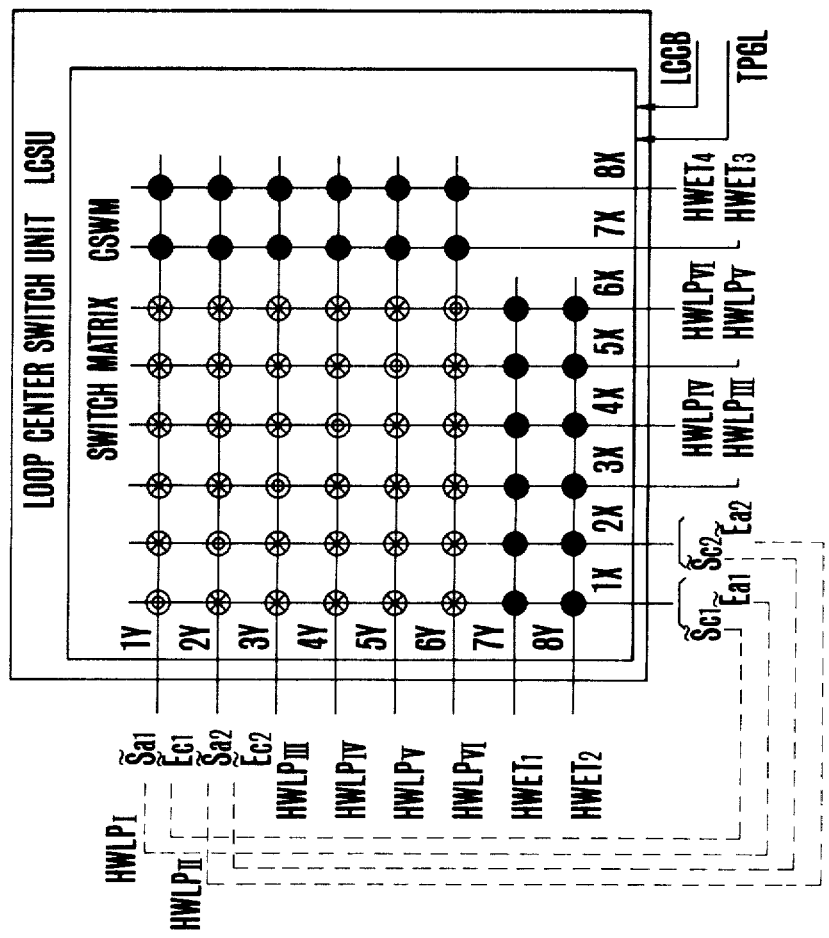
FIG. 11 shows the connection of the switch matrix in the center office.

FIG. 11 shows a switch matrix CSWM which is particularly suitable for the embodiment shown in FIG. 10 including a plurality of transmission line pairs.

More particularly, if the switch matrix CSWM shown in FIG. 9 is used in the embodiment of FIG. 10, the mutual communication between the local offices $LOE_{I1}-LOW_{Ik}$ and the local offices $LOE_{II1}-LOE_{IIq}$ must be made through the telephone exchange in the center office COE via external transmission lines $HWEI_1-HWET_4$. In contrast, according to the loop center switch unit LCSU shown in FIG. 11, communication between local offices in the transmission line pairs $HWLP_I$ and $HWLP_{II}$ is possible without passing through the telephone exchange switches mentioned above.

For the sake of brevity, it is assumed that the number in systems of the first transmission line pair $HWLP_I$ and in the second transmission line pair $HWLP_{II}$ is each one, and that these systems are connected to the output/input terminals $S_{al}-E_{c2}$ and $S_{cl}-E_{a2}$. Actually, transmission line pairs $HWLP_{III}-HWLP_{VI}$ are also connected to the Y axis bus lines 3Y-6Y and X axis bus lines 3X-6X.

The arrangement of switches represented by double small circles and black circles is identical to those shown in FIG. 9. Unless otherwise stated, it should be understood that the connection between respective transmission line pairs $HWLP_I-HWLP_{VI}$ and respective bus lines 1Y-6Y and 1X-6X and the arrangement of the switches are not changed.

In FIG. 11 switches represented by symbols ⊗ are added to those shown in FIG. 9 for interconnecting transmission line pairs $HWLP_I-HWLP_{VI}$. When switches (1Y, 2X) and (2Y, 1X) are simultaneously closed, a cross connection circuit is established which interconnects the first transmission line pair $HWLP_I$ and the second transmission line pair $HWLP_{II}$ to form a loop by these two pairs.

More particularly the starting end $\tilde{S}_{cl}$ of the clockwise transmission line of the first transmission line pair $HWLP_I$ is connected to the terminal end $\tilde{E}_{c2}$ of the clockwise transmission line of the second transmission line pair $HWLP_{II}$, whereas the terminal end $\tilde{E}_{al}$ of the counter clockwise transmission line of the first transmission line pair $HWLP_I$ is connected to the starting end $\tilde{S}_{a2}$ of the counterclockwise transmission line of the second transmission line pair. Further, the terminal end $E_{cl}$ of the clockwise transmission line of the first transmission line pair $HWLP_I$ is connected to the starting end $\tilde{S}_{c2}$ of the clockwise transmission line of the second transmission line pair $HWLP_{II}$, and the starting end $\tilde{S}_{al}$ of the counterclockwise transmission line of the first transmission line pair is connected to the terminal end of the counterclockwise transmission line of the second transmission line pair. As a consequence when a particular different purpose time slot is assigned to this loop for permitting communication between the local offices $LOE_{I1}-LOE_{Ik}$ and the local offices $LOE_{I1}-LOE_{IIq}$, it becomes possible to establish a circuit for a connection request between the loops according to the flow chart shown in FIG. 6.

FIG. 12 shows the manner of assigning the different purpose time slot groups for the embodiment of FIG. 10 based on the operation of the switch matrix CSWM shown in FIG. 11 as well as the mutual connection. In FIG. 12 the different purpose time slot groups $TG_{iI}$ and $TG_{eI}$ are used to effect communication between the local offices $LOE_{I1}-LOE_{Ik}$ belonging to the first transmission line pair $HWLD_I$ and also between local offices $LOE_{I1}-LOE_{Ik}$ and the telephone exchange switch in or near the center office COE. The different purpose time slot groups $TG_{iII}$ and $TG_{eII}$ are used to effect communication between local offices $LOE_{II1}-LOE_{IIq}$ belonging to the first transmission line pair $HWLP_{II}$ and also between local offices $LOE_{II1}-LOE_{IIq}$ and the telephone exchange switch in or near the center office COE. The different purpose time slot group $TG_{I\,II}$ is used to effect communication between the local offices $LOE_{I1}-LOE_{Ik}$ belonging to the first transmission line pair $HWLP_I$ and the local offices $LOE_{II1}-LOE_{IIq}$ belonging to the second transmission line pair $HWLP_{II}$. Arrows indicate mutual connections.

The mutual connection between respective transmission line pairs $HWLP_I$ and $HWLP_{II}$ and external transmission lines $HWET_1$ and $HWET_2$, and shown by arrows, is performed by a switch located at one cross point between one of the X axis bus lines and one of the Y axis bus lines of the switch matrix CSWM shown in FIG. 11. More particularly, in FIG. 12, an arrow toward the different purpose time slot group $TG_{iI}$ shows the connection between the output/input terminals $\tilde{S}_{al}$ and $\tilde{E}_{cl}$ of the first transmission line pair $HWLP_I$ and the other output/input terminals $\tilde{S}_{al}$ and $\tilde{E}_{al}$ of the first transmission line pair $HWLP_I$. Accordingly, in this case, the cross points of the switch matrix CSWM are represented by switches located at the cross points (1Y, 1X) shown by double circles between the Y axis bus line 1Y connected to the output/input terminals $S_{al}$ and $E_{cl}$, and the X axis bus line 1X connected to the output/input terminals $\tilde{S}_{cl}$ and $\tilde{E}_{al}$. These switches are turned on at respective time slots comprising the different purpose time slot group $TG_{iI}$.

This is true for another different purpose time slot groups $TG_{eI}$, $TG_{iII}$, $TG_{eII}$ and $TG_{I\,II}$ so that when the switches located at predetermined cross points are closed by corresponding timings, the mutual connections shown in FIG. 2 are made.

Although the switch matrix CSWM shown in FIG. 11 is constructed such that any desired circuits may be established between respective transmission line pairs $HWLP_I-HWLP_{VI}$ and respective external transmission lines $HWET_L-HWET_4$, under certain conditions the construction of the switch matrix may be simplified.

For example, in FIG. 11, when the transmission line pairs $HWLP_{II}-HWLP_{VI}$ belong to the second group, switches shown by double circles and adapted to interconnect the transmission line pairs $HWLP_{II}-HWLP_{VI}$ may be omitted. Further, in a case when all communications are made via the telephone switch on the side of the center office COE, all switches represented by double circles and ⊗ can be omitted. In other cases, various modifications are possible, but the following description is made on the assumption that any desired mutual connection is possible. In the block diagram shown in FIG. 13, for the purpose of assigning as desired the different purpose time slot groups, time slot converters $CTSC-T_{1A}-CTSC-T_{6C}$ and $CTSC-E_1-CTSC-E$ are interposed between the output/input terminals $\tilde{S}_{a1}-\tilde{E}_{a6}$, for the transmission line pairs HWLP$_1$-HWLP$_{VI}$, and the external transmission lines HWET$_1$-HWEP$_4$.

Figure 14:
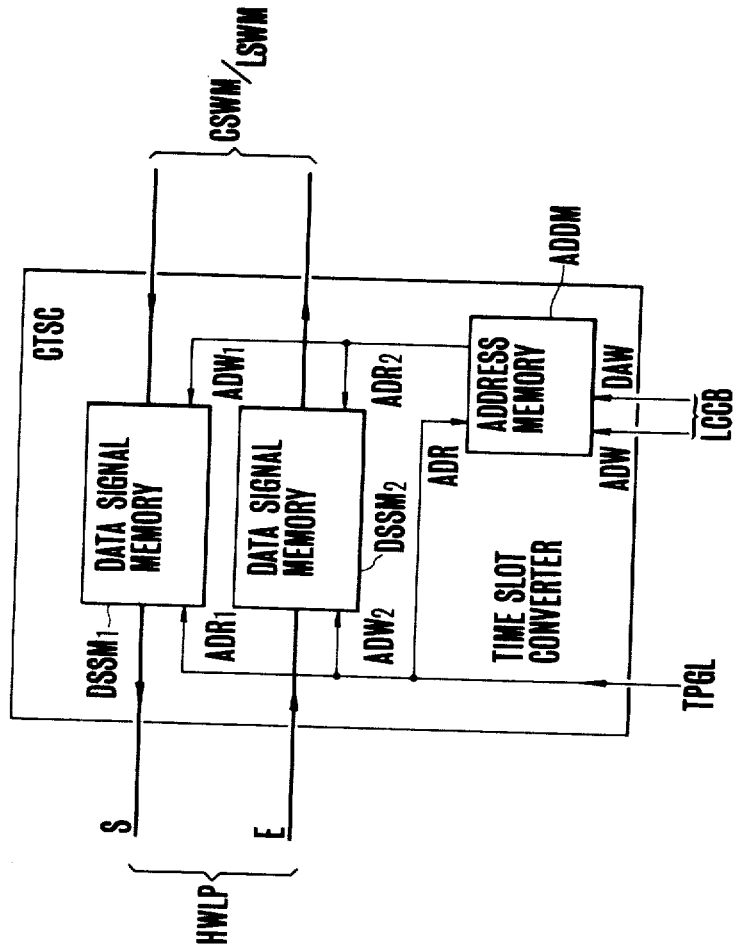
FIG. 14 is a block diagram showing the detail of the time slot converter.

FIG. 14 is a block diagram showing one example of the construction of the time slot converter CTSC in which DSSM$_1$ and DSSM$_2$ designate a data signal memory device utilizing a RAM. ADDM designates an address memory device also utilizing a RAM. With regard to the data signal memory device DSSM$_2$, since a time slot number designating signal from the timing pulse generator TPG is applied to a write address terminal ADW$_2$ via signal line TPGL, the data signals arriving at the end terminal E of a transmission line are successively stored in addresses having the same numbers as the time slot numbers. On the other hand, the address memory device ADDM stores read out address information for the data signal memory device DSSM$_2$. Such read out address information is read out by the same signal as the write address designation for the data signal memory device DSSM$_2$ and then applied to the read out address terminals ADR$_2$ of the data signal memory device DSSM$_2$. As a consequence, the data signals stored in the data signal memory device DSSM$_2$ are sequentially converted into the order of the time slot numbers corresponding to the read out address stored in the address memory device ADDM, from the order of the time slot numbers carrying the data signals. The content change of the address memory device is applied to the write address terminal ADW and the data terminal DAW from the central office processor CPS via signal line LCCB. With regard to the data signal memory device DSSM$_2$, the write and read designations for the write address terminal ADW$_1$ and the read address terminal ADC$_1$ of the data signal memory device DSSM$_2$ are made to be opposite whereby the time slot conversion is made in the opposite direction.

The time slot converter CTSC effects time slot conversion in which time slots which are different for respective transmission lines are shifted to predetermined time positions.

Figure 13:
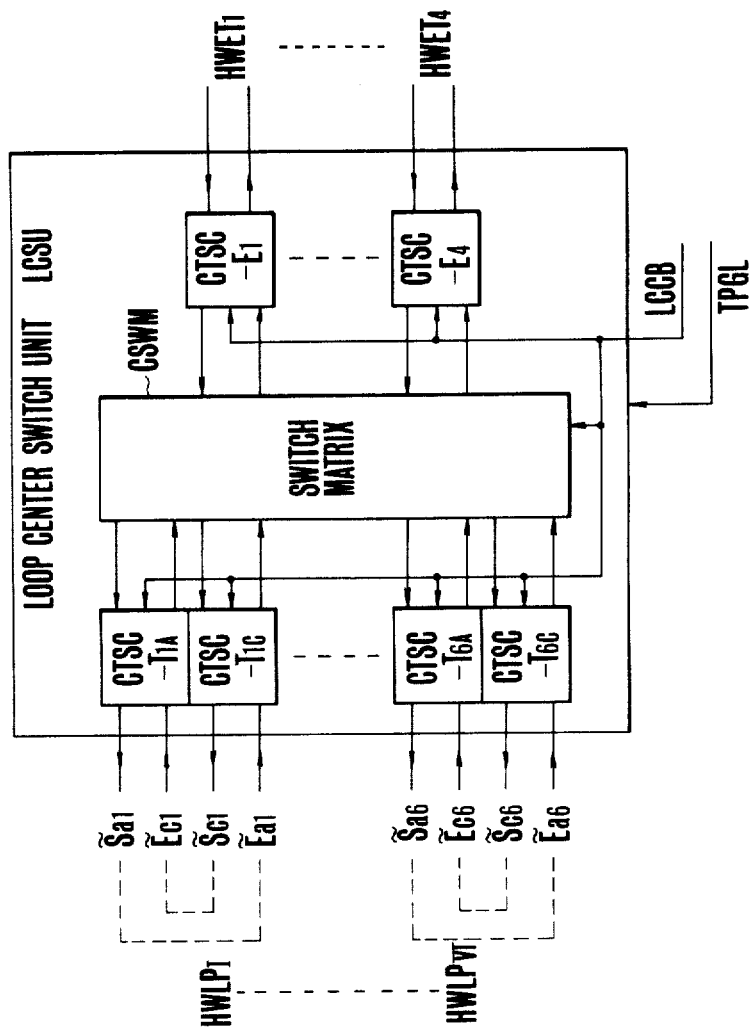
FIG. 13 is a block diagram showing provision of a time slot converter for the loop center switch unit in the center office.

FIG. 15 is a diagram wherein the construction of the switch matrix CSWM is made to be the same as that shown in FIG. 11 and the time slot converters CTSC-E$_1$ and CTSC-E$_3$ of the loop center switch unit LCSU shown in FIG. 13 are operated to establish a connection similar to that shown in FIG. 15. The upper stages shown in FIG. 15 show the different purpose time slot groups assigned to the transmission side of the time slot converter. That is the different type time slot groups are assigned to respective transmission lines whereas the lower stages show different purpose time slot groups which have been subjected to time slot conversion and then applied and received to and from the switch matrix CSWM.

In this case, the operation of the switch matrix is quite the same as that of FIG. 12 and only the time slot converters CTSC-E$_1$ and CTSC-E$_3$ are operated to effect time slot conversion. More particularly, the different purpose time slot group TG$_{eI}$ of the first transmission line pair HWLP$_1$ and the different purpose time slot group TG$_{eI}$ of the external transmission lines HWET$_1$ and HWET$_3$ are interconnected after being mutually shifted in time. The different purpose time slot group TG$_{eII}$ of the second transmission line pair NWLP$_{II}$ and the different purpose time slot group TG$_{eII}$ of the external transmission lines HWET$_1$ and HWET$_2$ are also related similarly. Therefore it is possible to individually assign the time slot numbers comprising different purpose time slot groups TG$_{eI}$ and TG$_{eII}$ to transmission line pairs HWLP$_1$ and HWLP$_{II}$ and the external transmission lines HWET$_1$ and HWET$_3$, respectively.

Accordingly, when the time slot converters CTSS-T$_{1A}$-CTSC-T$_{6c}$ are caused to effect similar time slot conversion, flexible assignment of the different purpose time slot groups can be made.

Figure 16:
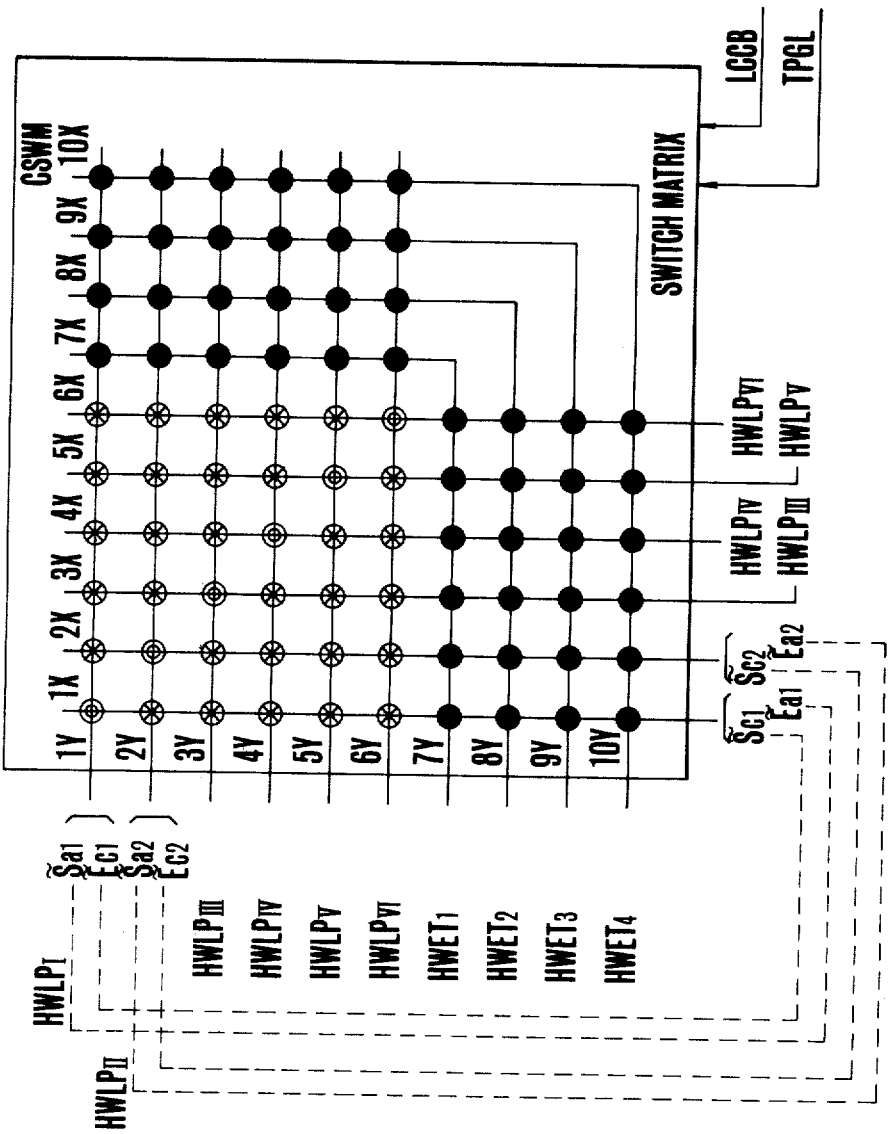
FIG. 16 shows the connection of switch matrix utilized in the center office where a time slot converter is used.

FIG. 16 shows another example of the time switch matrix CSWM utilizing the time slot, In the switch matrix CSWM shown in FIG. 11, the external transmission lines HWET$_1$-HWET$_4$ are divided into two groups and are connected to Y axis bus lines 1Y-6Y or X axis bus lines 1X-6X respectively. The external transmission lines HWET$_1$-HWET$_4$ can be connected to respective bus lines 1Y-6Y and 1X-6X.

Thus, by changing the connection of the external transmission lines HWET$_1$-HWET$_4$ to the Y axis bus lines 7Y-10Y it becomes possible to determine as desired the mutual connections between respective transmission line pairs HWLP$_1$-HWLP$_M$ and the external transmission lines HWET$_1$-HWET$_4$.

Figure 17:
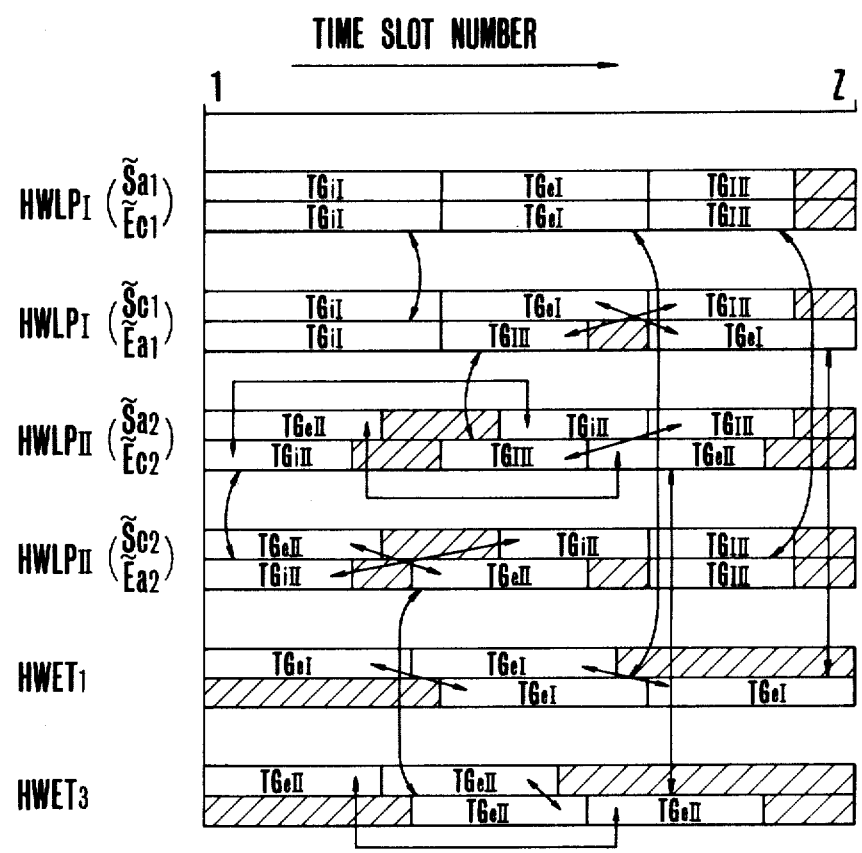
FIG. 17 is a graph showing the manner of assigning time slot groups for different purposes and the manner of time slot conversion when establishing a circuit by using the switch matrix shown in FIG. 16.

FIG. 17 shows a case wherein the mutual connections are effected with the switch matrix CSWM shown in FIG. 16 by operating the time slot converters CTSC-T$_{1c}$, CTSC-T$_{1a}$ and CTSC-T$_{2c}$ on the side of the output/input terminals $\widetilde{S}_{c1}$ and $\widetilde{E}_{a1}$ and on the side of the output/input terminals $\widetilde{S}_{a2}$, $\widetilde{E}_{c2}$ and $\widetilde{S}_{c2}$, $\widetilde{E}_{a2}$ of the loop center switch unit LCSU while maintaining the same the assignment of the different purpose time slot groups on the transmission line pairs HWLP$_1$ and HWLP$_{II}$ as that shown in FIG. 15. In FIG. 15 the different purpose time slot group TG$_{eI}$ (connected to the output/input terminals $\widetilde{S}_{c1}$ and $\widetilde{E}_{a1}$) and the different purpose time slot group TG$_{eII}$ (connected to the output/input terminals $\widetilde{S}_{c2}$ and $\widetilde{E}_{a2}$) are connected to the external transmission lines, whereas the different purpose time slot group TG$_{eI}$ (connected to the output/input terminals $\widetilde{S}_{a1}$ and $\widetilde{E}_{a1}$) and the different purpose time slot group TG$_{eII}$ (connected to the output/input terminals $\widetilde{S}_{a2}$ and $\widetilde{E}_{c2}$) are connected to the external transmission line HWET$_3$. On the other hand, in FIG. 17, each different purpose time slot group TG$_{eI}$ (connected to the output/input terminals $\widetilde{S}_{a1}$ and $\widetilde{E}_{c1}$) and the different purpoe time slot group TG$_{eI}$ connected to the output/input terminals $\widetilde{S}_{c1}$ and $\widetilde{E}_{a1}$) is connected to the external transmission line HWET$_1$; the different purpose time slot group TG$_{eII}$(connected to the input/output terminals $\widetilde{S}_{a2}$, $\widetilde{E}_{c2}$, $\widetilde{S}_{c2}$ and $\widetilde{E}_{a2}$) is independently connected to the external transmission line HWET$_3$.

In this manner, by connecting the same different purpose time slot group on the same transmission pair to a different output/input terminal, it can be possible to independently connect the time slot group to the external transmission line thereby increasing the freedom of the circuit establishment.

Figure 18:
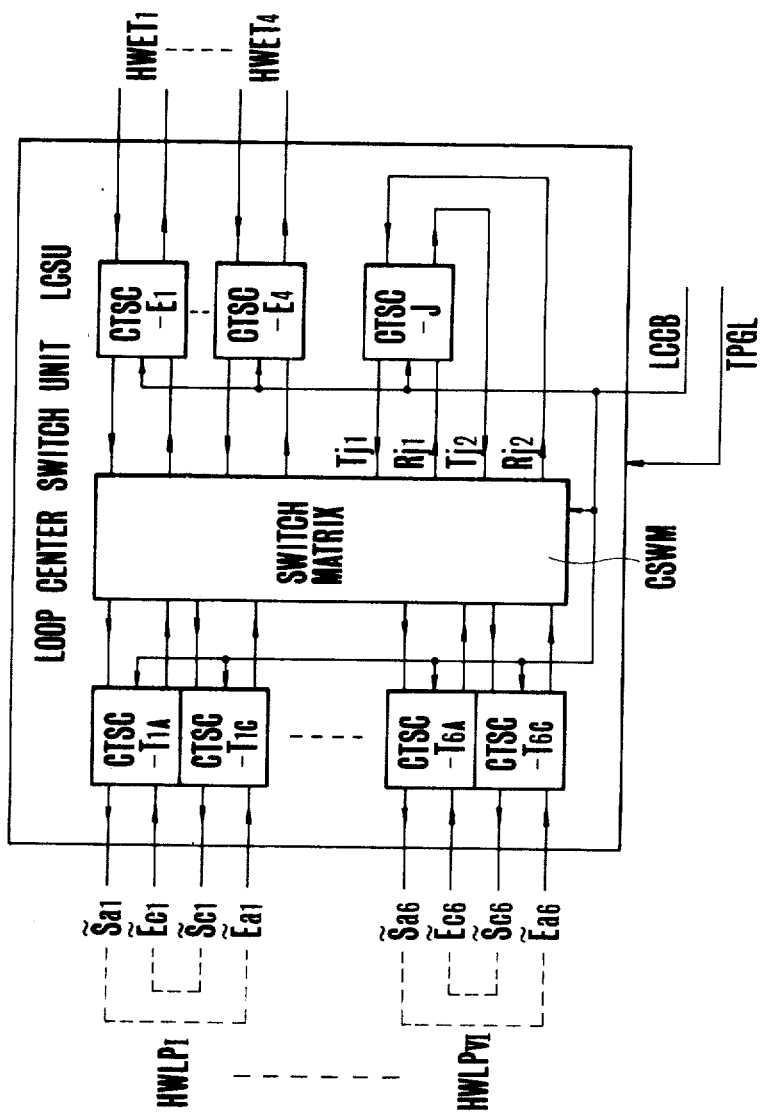
FIG. 18 is a block diagram wherein a time slot converter for an intermediate connection is provided for the loop center switch unit in the center office.

FIG. 18 shows an improved loop center switch unit LCSU capable of improving the circuit utilization efficiency by assigning the different purpose time slot group TG$_{I\,II}$ for the communication between the local offices LOE$_{I1}$-LOE$_{Ik}$ belonging to the first transmission pair HWLP$_I$ shown in FIG. 10 and the local offices LOE$_{II1}$-LOE$_{IIq}$ belonging to the second transmission line pair HWLP$_{II}$. In the loop center switch unit LCSU shown in FIG. 18, a time slot converter CTSC-J for intermediate connection is added to the loop center switch unit LCSU shown in FIG. 13 and as the switch matrix unit CSWM is used that shown in FIG. 19.

Figure 19:
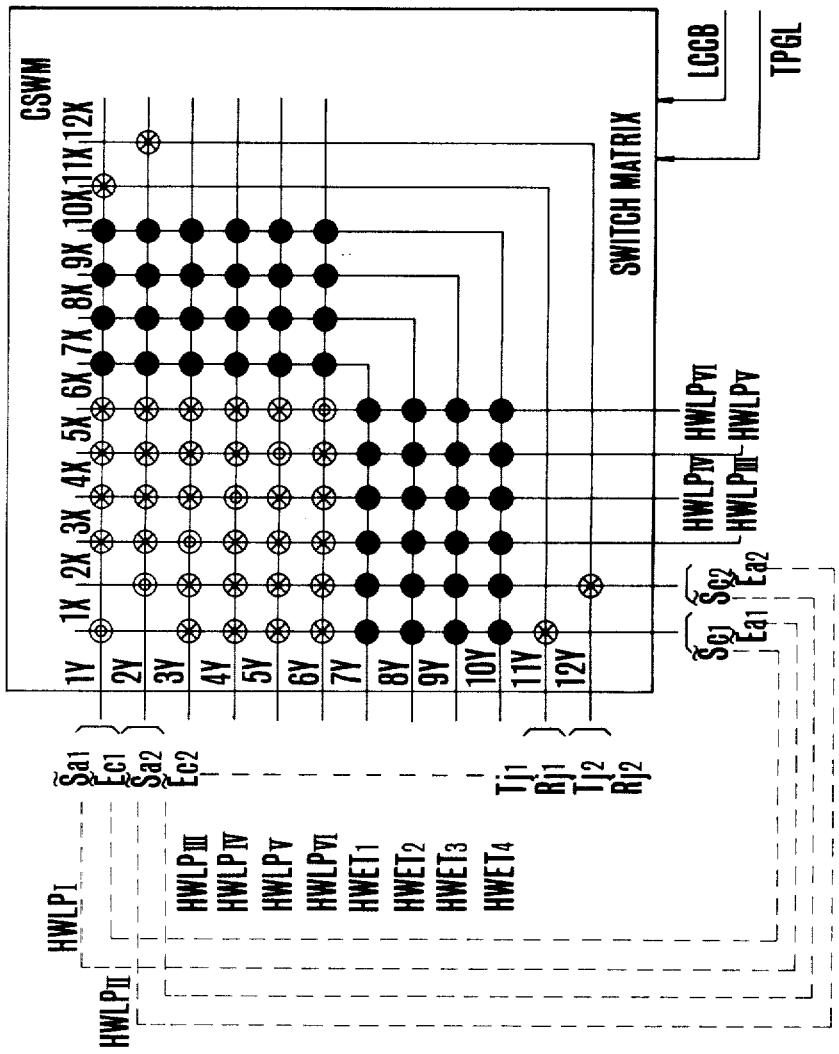
FIG. 19 is a connection diagram of the switch matrix utilized in FIG. 18.

In the switch matrix CSWM shown in FIG. 19, the output/input terminals $\widetilde{S}_{a1}$, $\widetilde{E}_{c1}$, $\widetilde{S}_{c1}$ and $\widetilde{E}_{a1}$ of the first transmission line pair HWLP$_I$ are connected to the terminals T$_{j1}$ and R$_{j1}$ of the time slot converter CTSC-J for intermediate connection via switches (1Y, 11X) and (11Y, 1X) and to the other terminals T$_{j2}$ and R$_{j2}$ of the time slot converter CTSC-J. They are also connected the output/input terminals $\tilde{S}_{a2}$, $\tilde{E}_{c2}$, $\tilde{S}_{c2}$ and $\tilde{E}_{a2}$ of the second transmission line pair HWLP$_{II}$ respectively through switches (2Y, 12X) and (12Y, 2X). Thus, the time slot converter CTS-J is connected between the first and second transmission line pairs HWLP$_I$ and HWLP$_{II}$, and the time slot converter CTSC-J is operated for effecting time slot conversion for each time slot depending upon the manner of mutual connection between the first and second transmission line pairs HWLP$_I$ and HWLP$_{II}$.

Figure 20:
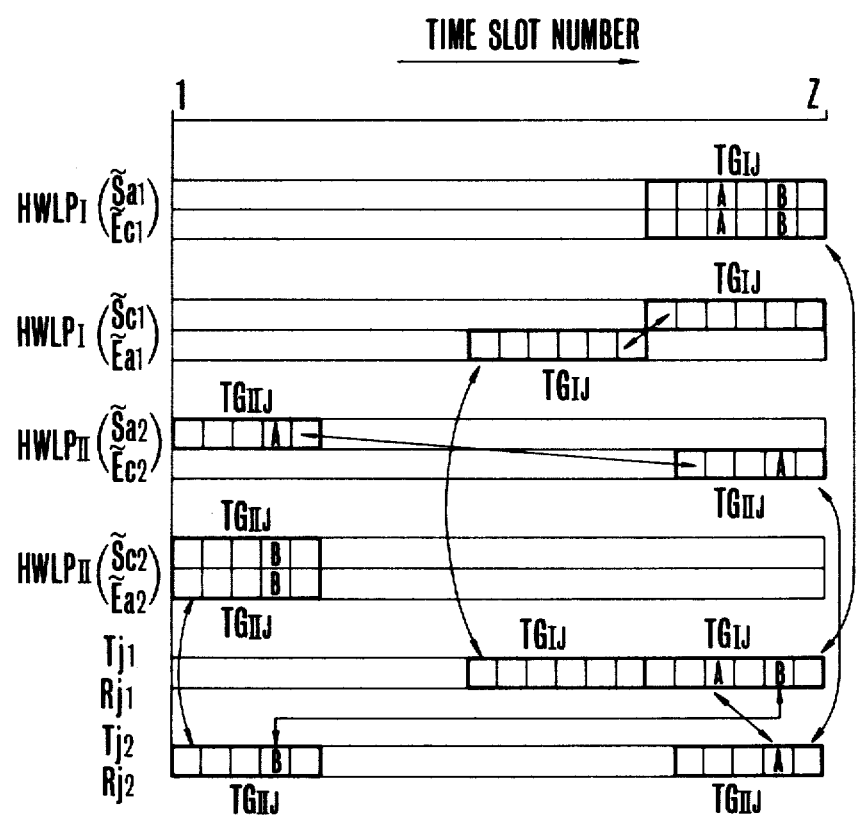
FIG. 20 is a graph showing the manner of assigning time slot groups for different purposes and the manner of converting the time slots when establishing a circuit by using the matrix switch shown in FIG. 19.

FIG. 20 shows the manner of time slot conversion and the manner of connection effected between the loop center switch matrix CSWM, when initiating communication between the local office LOE$_{II1}$ and the local office LOW$_1$ of the first transmission line pair HWLP$_I$, which communication is made between the local office LOE$_{jk}$ of the first transmission line pair HWLP$_I$ and the local office LOE$_{II1}$ of the second transmission line pair HWLP$_{II}$ when the loop center switch LCSU (having a construction as shown in FIG. 18 and FIG. 19) is applied for the center office COE shown in FIG. 10. In FIG. 20, for the purpose of permitting communication between the local offices LOE$_{I1}$-LOE$_{Ik}$ (belonging to the first transmission line pair HWLP$_I$) and the local offices LOE$_{II1}$-LOE$_{IIq}$, the different purpose time slot group TG$_{Ij}$ of the first transmission line pair HWLP$_j$ comprises time slot groups commonly used for different purposes and assigned to the first transmission line pair HWLP$_I$. However, to permit communication between the local offices LOE$_{II1}$-LOE$_{IIq}$ (belonging to the second transmission line pair HWLP$_{II}$) and the local offices LOE$_{I1}$-LOE$_{Ik}$ (belonging to the first transmission line pair HWLP$_I$), the different purpose time slot group TG$_{IIj}$ of the second transmission line pair HWLP$_{II}$ includes the different purpose time slot group assigned to the second transmission line pair HWLP$_{II}$. The steps of connecting the different purpose time slot groups TG$_{Ij}$ and TG$_{IIj}$ to the terminals T$_{j1}$, k$_{j1}$ and T$_{j2}$, R$_2$ of the intermediate connection time slot converter CTS-J by the switch matrix CSWM is identical to that described in connection with FIG. 17, so that it is believed unnecessary to describe such steps.

For the sake of description, it is assumed that the circuit has been established between the local offices LOE$_{Ik}$ and LOE$_{II}$, that communication of the data signal has been made between these local offices and that a new connection request from the local office LOE$_{II1}$ to the local office LOE$_1$ has occurred.

More particularly, the different purpose time slot group IG$_{Ij}$ via output/input terminals S$_{aI}$ and E$_{c1}$ is assigned for the communication between the local offices LOE$_{jk}$ and LOE$_{I1}$ and signals are applied to the terminals T$_{j1}$ and R$_{j1}$. Among the signals only the data signal A is subjected to time slot conversion by the time slot converter CTSC-J and then inserted into the different purpose time slot group TG$_{IIj}$ of the terminals T$_{j2}$ and R$_{j2}$. Thereafter the different purpose time slot group TG$_{IIj}$ as a whole is subjected to time slot conversion by the time slot converter CTSC-T$_{2A}$ on the side of the output/input terminals $\tilde{S}_{a2}$ and $\tilde{E}_{c2}$, and the exchanges between the second transmission line pair HWLP$_{II}$ via the output/input terminals $\tilde{S}_{a2}$ and $\tilde{E}_{c2}$ thereby establishing a circuit between the local offices LOE$_{Ik}$ and LOE$_{II}$ by utilizing the data signal A.

Accordingly, the different purpose time slot group TG$_{Ii}$ of the first transmission time pair HWLP$_I$ via the output/input terminals and the different purpose time slot group TG$_{IIj}$ of the second transmission time pair via the output/input terminals $\tilde{S}_{12}$ and $\tilde{E}_{as}$ are idle circuits.

Under these conditions, when another connection request is made from the local office LOE$_{II1}$ to the local office LOF$_{T12}$ belonging to the first transmission line pair HWLP$_I$, again the central office processor CPS of the center office COE establishes a route according to the flow chart shown in FIG. 6. In this case, however, the flow chart is not executed by utilizing the local offices LOE$_{II1}$ and LOE$_{I1}$ as the calling and called offices, but the flow chart is executed by utilizing the called office as the time slot converter CTSC-J so as to establish a circuit by utilizing the different purposes time slot group. As a consequence, the different purpose time slot group TG$_{IIj}$ on the side of the output/input terminals $\tilde{S}_{12}$ and $\tilde{S}_{a2}$, which is now idle with respect to the local office LOE$_{II1}$, would be used as the data signal for the new connection request.

Then the central office processor CPS executes the flow chart shown in FIG. 6 by utilizing the calling office as the time slot converter CTSC-J and the called office as the local office LOE$_{I1}$ so as to assign a time slot different from the data signal in the different purpose time slot group on the side of the output/input terminals S$_{a1}$ and E$_{c1}$ to the data signal B thereby establishing a channel between local offices LOE$_{II1}$ and LOE$_{II1}$.

Then, although the time position of the time slots becomes different between the terminals T$_{j1}$, R$_{j1}$ and terminals T$_{j2}$, R$_{j2}$ of the time slot converter CTSC-J, such difference can be eliminated by the time slot converting operation of the time slot converter CTSC-J for each time slot. Thus, the data signal B of the different purpose time slot group G$_{IIj}$ on the side of the terminals T$_{j2}$ and R$_{j2}$ is converted into the data signal B of the different purpose time slot group TG$_{Ij}$ on the side of the terminals T$_{j2}$ and R$_{j1}$ and then is exchanged between the terminals T$_{j1}$, R$_{ji}$ and the output/input terminals $\tilde{S}_{a1}$ and $\tilde{E}_{c1}$.

As above described, where an interconnection time slot converter CTSC-J is provided, it is not necessary to make the same the number of slots that constitute the different purpose time slot groups of both transmission line pairs. Any number of the time slots may be used. Moreover, since it is possible to process connection requests of respective local offices by deeming the time slot converter CTSC-J an intermediate calling/called office. Accordingly, where there are many local offices whose frequency of connection requests is low, the channel efficiency of the circuit can be improved greatly.

The timing for rendering ON the respective switches of the switch matrix is synchronized with the timing of the time slots of the different group time slot groups to be interconnected so that the time slot conversion of respective time slot converters is synchronous with the timing of rendering ON a predetermined switch of the switch matrix CSWM.

While in the foregoing description, it was assumed that the external transmission lines HWET$_1$-HWET$_l$ and HWLO$_1$-HWLO$_j$ are to be connected to telephone exchange switches, it is to be noted that the invention is not limited to such connection and that the external transmission lines HWET$_1$-HWET$_l$ may be connected to other loop center devices, connectors, various terminal devices, and testing devices of the loop center devices.

It is also possible to establish a circuit to the telephone exchange on the side of the center office by the processor of the telephone exchange.

Although in the foregoing description, time slots were individually handled, and individual slots were grouped as a different purpose time slot group, instead of separately treating individual time slots, it is also possible to construct a time slot block with several adjacent time slots and to handle the time slot block as a unit. Then it is possible to simplify the hold memory device of the matrix switch and the address memory device ADDM of the time slot converter.

FIGS. 21A, 21B and 21C show the concept of a time slot block. Taking FIG. 21A as an example in which data signal time slots No.1 through No.16 constitute one frame, to individually designate time slots 1 to 16, a 4 bit signal, as shown in FIG. 21C, is necessary where an ordinary signal is used to convert it into binary signals.

However, where adjacent time slots 1 and 2, 2 and 3 and so forth are used to form respective blocks $B_1$, $B_2$ and so forth—, blocks as shown in FIG. 21C can be obtained in which the number of blocks $B_1$–$B_8$ is decreased to one half of the number of blocks 1–16 so that when individually designating the blocks $B_1$–$B_8$, the least significant bit $2^0$ shown in FIG. 21C becomes independent thus making it possible to individually designate respective blocks $B_1$–$B_8$ by using only the higher order bits $2^1$–$2^3$.

More particularly a 4 bit signal is necessary to individually treat time slots 1 through 16, whereas only a 3 bit signal is sufficient to individually treat time slot blocks $B_1$ through $B_8$.

Figure 22:
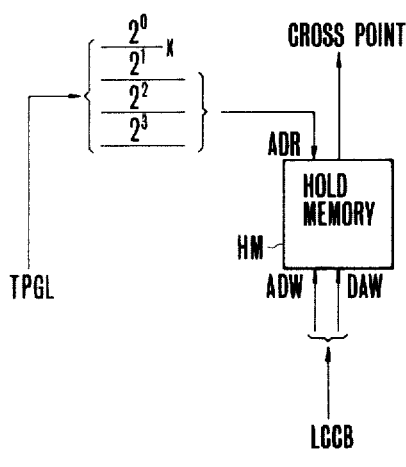
FIG. 22 is a connection diagram showing the manner of using a hold memory device for the switch matrix where the concept of the time slot block is applied.

Thus, with regard to the hold memory device HM of the switch matrix CSWM, as shown in FIG. 22, it is necessary to apply only the upper order bits $2^1$–$2^3$ of the 4 bit signal to a read address designation terminal ADR. By making the data from the central processor CPS correspond to individual time slot blocks $B_1$–$B_8$ and then applying the data to a data write terminal DAW, the switches at respective cross points of the switch matrix CSWM are turned ON by utilizing two time slot intervals as a unit thereby continuously passing data signals of two time slots with specified timings. Accordingly, the capacity of the hold memory device HM can be reduced to one half of that shown in FIG. 9B.

Figure 23:
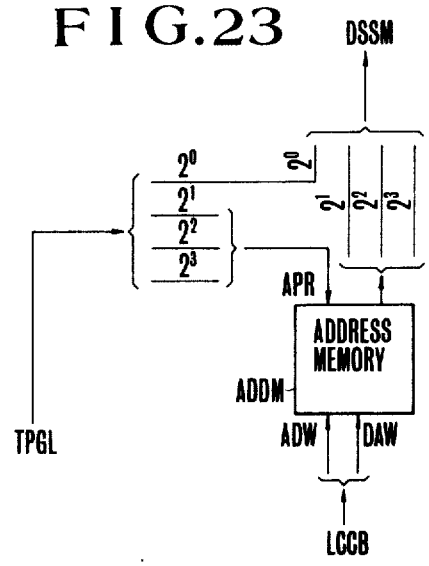
FIG. 23 is a connection diagram showing the manner of using the address memory device for the time slot converter when the concept of the time slot block is applied.

With reference to the address memory device ADDM of the time slot converter, as shown in FIG. 23, the content thereof is read out only with the higher order bits $2^1$–$2^3$. The contents corresponding to the upper order bits $2^1$–$2^3$ are stored therein as designation signals for time slot conversion and the higher order bits $2^1$–$2^3$ read out from the address memory device ADDM are combined with the least significant bit $2^0$ from the timing pulse generator TPGL and then applied to respective data signal memory devices $DSSM_1$ and $DSSM_2$.

Figure 21:
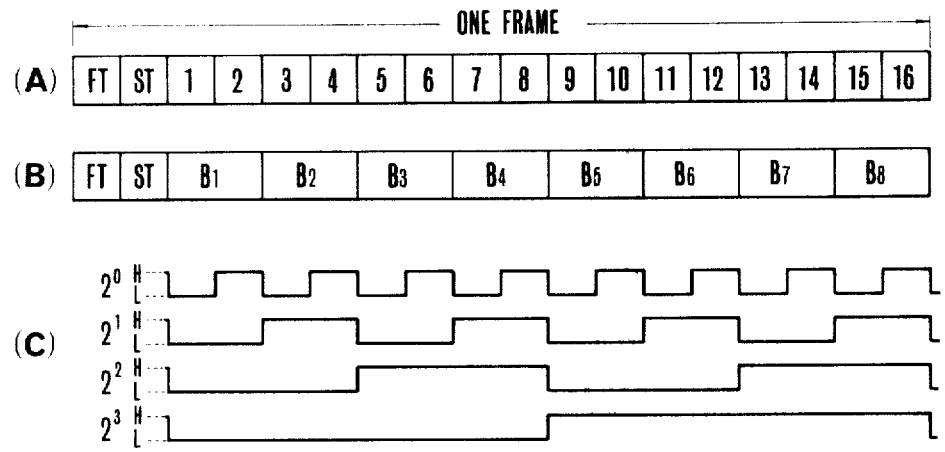
FIGS. 21A through 21C show the concept of the time slot blocks.

More particularly, the memory content of the address memory device ADDS is required to have 4 bits for each address. However, where the concept shown in FIG. 21 is applied, the memory capacity can be reduced to 3 bits for each address thereby decreasing the memory capacity to $\frac{3}{4}$. Moreover, the number of the time slot blocks $B_1$–$B_8$ can be reduced to one half of that of the number required in a case where time slots 1–16 are individually designated. Thus, the number of information bits which designate time slot conversion is reduced to $\frac{1}{2}$ with the result that the capacity of the address memory device can be reduced to $(\frac{3}{4}) \times (\frac{1}{2}) = (\frac{3}{8})$.

It is to be noted that it is not necessary to form one time slot block with two time slots. A time slot block may be constituted by K consecutive time slots (where $K = 2^H$, and by making H as a positive integer, the efficiency can be improved) to form one frame with L (any value) time slots and that different purpose time slot groups may be constructed by selecting the required number of predetermined time slot blocks.

Figure 24:
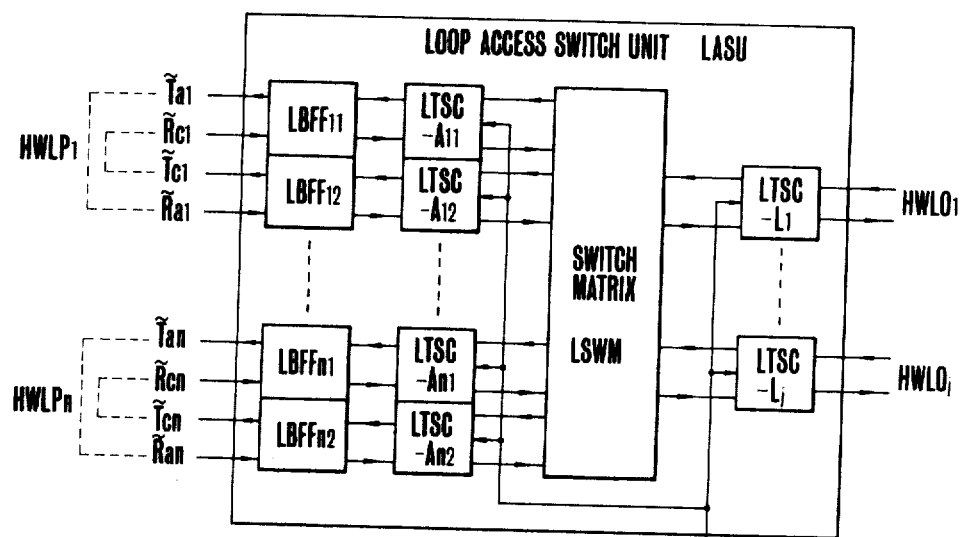
FIG. 24 is a block diagram showing a loop access switch unit installed in a local office.

FIG. 24 is a block diagram showing a construction of a loop access switch unit LASU in a local office LOE shown in FIG. 5. The switch matrix LSWM used is that shown in FIG. 25.

The loop access switch unit LASU is connected to the external transmission lines $HWLO_1$–$HWLO_j$ on one hand, and on the other hand connected to the receiving terminal $R_c$ of the clockwise transmission line $HWLP_c$ and the sending terminal $T_a$ of the counterclockwise transmission line $HWLP_a$, and to the sending terminal $T_c$ of the clockwise transmission line $HWLP_c$ and the receiving terminal $R_a$ of the counterclockwise transmission line $HWLP_a$ via the output terminals $\bar{T}_{al}$, $\bar{R}_{cl}$, $\bar{T}_{cl}$ and $\bar{R}_{al}$ whereby the loop access switch unit SASU is inserted into the transmission line HWLP.

Figure 25:
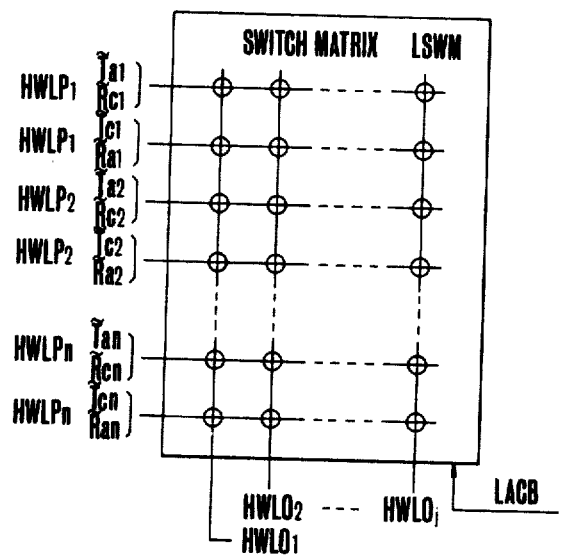
FIG. 25 is a connection diagram showing the switch matrix shown in FIG. 24.

It should be understood, however, that in the cases shown in FIGS. 24 and 25 the loop access switch unit LASU is inserted into a plurality of transmission line pairs $HWLP_1$–$HWLP_n$ to correspond to FIG. 5.

The buffer memory devices $LBFF_{11}$ through $LBFF_{n2}$ are similar to the buffer memory devices $BUF_{a1}$–$BUF_{cm}$ shown in FIG. 4. Thus, even with the same slot of the same number, the M route passing through point M does not match in time with the N route not passing through point M due to the difference in the transmitting distance. Accordingly, after matching the timing of routes M and N the communication between these routes and the time slot converters $LTSC$-$A_n$–$LTSC$-$A_{m2}$ is made possible. A time slot which has been matched in time is shifted in time by the time slot converters $LTAC$-$A_{11}$–$LTSC$-$A_{n2}$ in accordance with the connection of the time slot matrix LSWM and then used for communication with the matrix switch LSWM.

Respective time slots on the side of the external transmission lines $HWLO_1$–$HWLO_j$ are also not matched to each other. The time slot converters $LTSC$-$L_1$–$LTSC$-$L_j$ are provided for the purpose of positioning the time slots at positions along the time axis corresponding to connections.

Respective time slot converters $LTSC$-$A_{11}$–$LTSC$-$L_j$ and the switch matrix LSWM are controlled by the local office processor LCPS according to the time slot assignment and a circuit establish instruction from the central office processor CPS of the center office COE. Thus, when the switches at cross points, shown by small circles in FIG. 25, are turned ON in synchronism with an assigned time slot, the external transmission lines $HWLO_1$–$HWLO_j$ are connected to predetermined ones of the transmission line pairs $HWLP_1$–$HWLP_n$ via M or N route thus establishing a circuit as instructed by the central office processor CPS. As a consequence, communication can be made between the external transmission lines $HWLO_1$–$HWLO_j$ and a predetermined called office.

Figure 26:
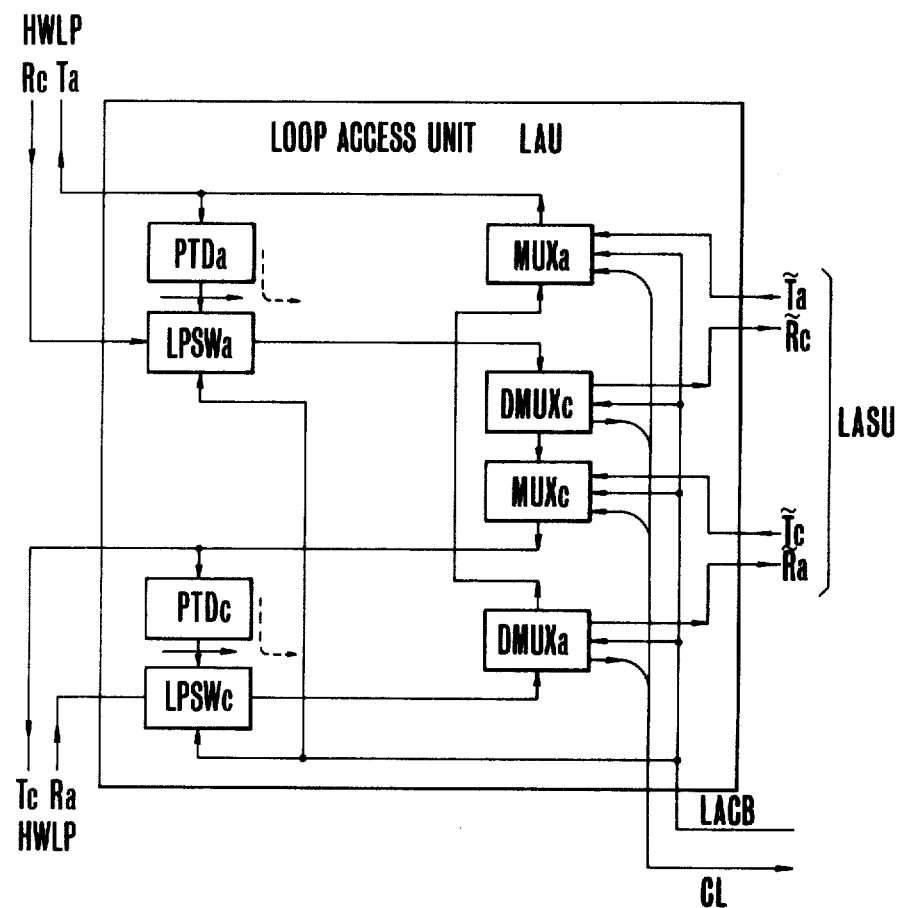
FIG. 26 is a block diagram showing a loop access unit for use in a local office provided with a preamble signal detector for processing a fault and a loop switch.

FIG. 26 is a block diagram showing a modified example of the loop access unit LAU, in which there are provided preamble signal detectors $PTD_a$ and $PTD_c$. Loop switches $LPSW_a$ and $LPSW_c$ are provided for the purpose of maintaining the performance of a transmission line pair HWLP as a whole irrespective of a failure on any one of the sections of the transmission line pair HWLP.

The preamble signal detectors $PTD_a$ and $PTD_c$ are constructed to extract only the frame synchronizing signal out of the frame slot FT shown in FIG. 3 and FIGS. 21A and 21B and to permit to pass the extracted frame synchronizing signal. Under certain conditions, the preamble signal detectors detect a maintenance message signal inserted into the signal time slot, a common control signal or the like and pass these signals.

The loop switches $LPSW_a$ and $LPSW_c$ normally form a circuit passing signals in directions shown by the solid arrows; upon occurrence of a failure, the circuit is transformed to pass signals in directions shown by the dotted line arrows under the control of the local office processors LCP via the control bus line LACB. This shunts preamble signals such as the frame synchronizing signal, the maintenance message signal and the common control signal, between the sending terminal $T_a$, receiving terminal of the transmission line pair HWLP or between the sending terminal $T_c$ and the receiving terminal $R_a$ so as to send back the preamble signals in directions in which they have been transmitted.

For brevity, FIG. 27 shows only the local offices $LOE_1$-$LOE_4$. Then when it is assumed that a failure occurs at a point shown by X on the transmission line pair HWLP both the clockwise transmission line $HWLP_c$ and the counterclockwise transmission line $HWLP_a$ are interrupted so that transmission of time slots of the frame synchronizing and another preamble signals becomes impossible. Especially, disappearance of the frame sychronizing signal causes the operations of the local offices $LOE_1$-$LOE_4$ to become asynchronous thus completely losing the communication ability.

However when the loop switches among the loop switches LPCW and $LPSW_c$ shown in FIG. 26 located adjacent a faulty section are transferred as above described in both local offices $LOE_1$ and $LOE_2$ adjacent the faulty section, connections shown by arrows $S_1$ and $S_2$ shown in FIG. 27 would be established via the preamble signal detectors $PTD_a$ or $PTD_c$ thereby dividing in two the transmission line pair HWLP. However, when seen from the center office COE two loop circuits are formed thus transmitting preamble signals including the frame synchronizing signal by respective loop circuits. In this manner, immediately after the change over, the synchronous states of the local offices $LOE_1$-$LOE_4$ are recovered thus making it possible to maintain the operation of the local offices so that the communication between various offices is resumed.

After a circuit is interrupted, it is necessary to reassign the time slot, as will be described hereinafter, to restore the communication through the circuit thus interrupted.

Further, since the preamble detectors $PTD_a$ and $PTD_c$ present the transmission of a data signal inserted into a time slot other than those for the preamble, the data signal, which has been sent to the receiving terminal $R_a$ of a local office $LDE_1$ from the center office COE through the counterclockwise transmission line $HWLP_a$ shown in FIG. 27, would not be returned to the center office COE by the clockwise transmission line $HWLP_c$ via the sending end $T_c$ of the local office $LOE_1$. Accordingly, it is possible to transmit different signals by independently using the clockwise transmission line $HWLP_c$ and the counterclockwise transmission line $HWLP_c$ in the same manner as under the normal condition.

Loop switches $SPSW_a$ and $LPSW_c$ can be transferred by any appropriate means.

More particularly, where a carrier wave is used to transmit such time slots as the frame synchronizing signal, etc., carrier wave detectors are provided for respective local offices for detecting the interruption of the carrier wave caused by the occurrence of a failure and then applying the fault information thus detected to the local office processor.

Alternatively, the presence or absence of the frame synchronizing signal be detected and the output of the detector amplified to the local office processor. The procedures may be selected according to the circumstance.

Figure 28A:
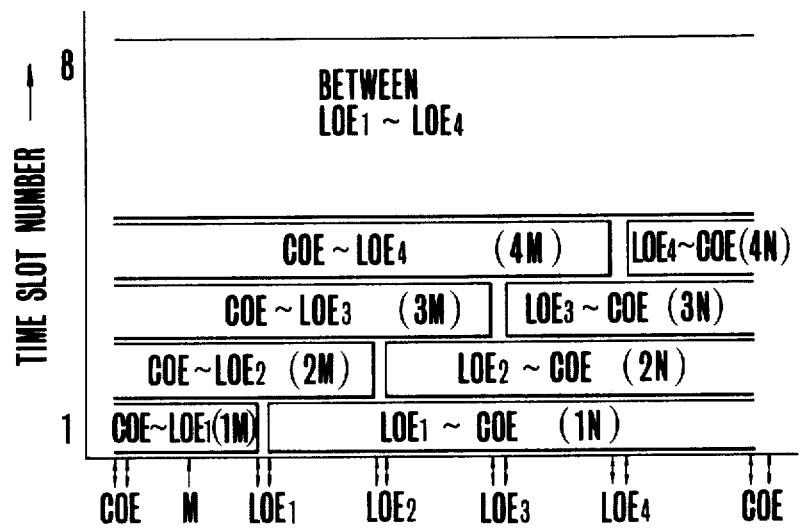
Figure 28:
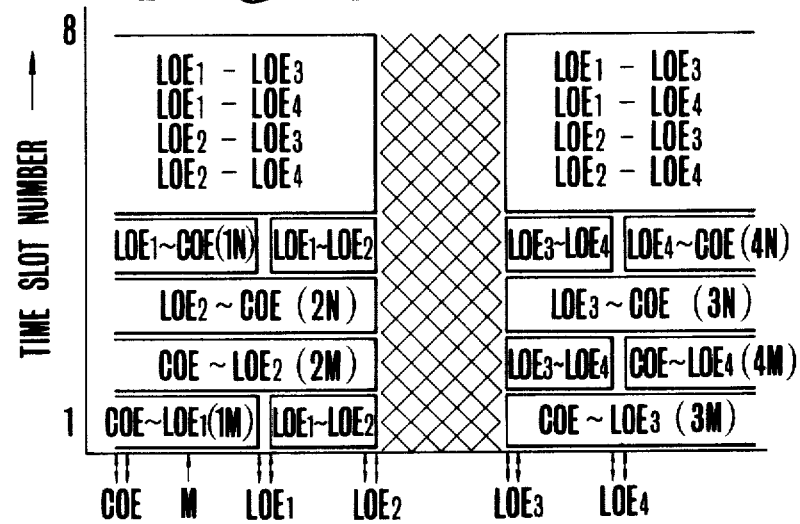

FIGS. 28A and 28B show the manner of reassignment of the time slot at the time of occurrence of the fault described above. More particularly, under the normal state, as shown in FIG. 28A, in the time slot No. 1, either one of the external transmission lines $HWET_1$-$HWET_i$ of the center office COE and the local office $LOE_1$ establish circuits of M route (1M) and N route (1N) while another local offices $LOE_2$-$LOE_4$ also establish circuits between these local offices and the center office COE by utilizing No.2 to No.4 time slots. In this case the time slots 5 through 8 are assigned to the communications between local offices $LOE_1$-$LOE_4$.

Thus, when it is supposed that a fault occurs between the local offices $LOE_2$ and $LOE_3$ as shown in FIG. 28B, circuits established through a cross-hatched section, that is the circuits 1N, 2N, 3M and 4M shown in FIG. 28A, would be interrupted, whereas the established circuits 1M, 2M, 3N and 4N shown in FIG. 28A would not be interrupted.

However, as shown in FIG. 28B, when the circuit 1N is assigned between the central office COE in time slot 4 and the local office $LOE_1$, the circuit 2N is assigned between the center office COE in time slot 3 and the local office $LOE_2$, the circuit 3M is assigned between the local office $LOE_3$ on the side of the local office $LOE_4$ in the time slot 1 and the center office COE and when the circuit 4M is assigned between the local office $LOE_4$ in the time slot 2 and the center office COE, it would be possible to establish circuits of the same number as in the normal state.

At this time, since the connections between the local offices $LOE_1$ and $LOE_2$ of time slot 1 between the local offices $LOE_3$ and $LOE_4$ of time slot 2, between the local offices $LOE_1$ and $LOE_2$ of time slot 5, and between the local offices $LOE_3$ and $LOE_4$ are idle time slots, it is possible to assign these idle time slots to effect mutual communication between local offices $LOE_1$-$LOE_9$. In the same manner as under the normal state, time slots 5 to 8 can be assigned between the local offices $LOE_1$-$LOE_9$.

More particularly, as shown in FIG. 28B, when reassigning time slots for circuits other than circuits already established, it is possible to establish substantially the same number of circuits as under conditions, thus assuming substantially the same number of circuits as under the normal condition irrespective of the occurrence of a fault. Although in the foregoing description reassignment of the time slots has been made, it is also possible to make assignment for different purpose time slot groups.

As above described, it is possible to always ensure operation of at least half the normal number of circuits. In some cases the time slot reassignment shown in FIG. 28B may be omitted.

Furthermore, it is also possible to provide an auxiliary center office in addition to the center office for distributing the capability of the center office. Further, it is possible to remove unit switch matrixes CSWM and LSWM in the center office and in the local offices LO-$E_1$-LOE$_k$ and substitute them with time division telephone exchanges. However, the use of the switch matrixes CSWM and LSWM is more advantageous because the same objects can be accomplished with a simple construction.

The switches in the switch matrixes CSWM and LSWM may use AND gate circuits. Various semiconductor circuits having switching speeds, corresponding to the period of the time slot may also be used.

The different purpose time slot groups may be separately selected time slots among a series of time slots, such selected time slots being treated as groups. Depending upon the characteristics of the data signals, a plurality of time slots may be assigned simultaneously to commonly use them as the same circuit. Thus, it will be clear that the invention can be varied as the circumstances require.

As can be clearly understood from the foregoing description, according to this invention, since a clockwise transmission line and a counterclockwise transmission line are utilized as a pair, it is easy to form high capacity communication circuits. Moreover, dealing with a circuit interruption becomes easy without providing any spare transmission line thus increasing the efficiency of utilization of the installation. Moreover, as the starting and terminal ends of each transmission line are connected to a center office, all maintenances and inspections can be made at the center office. Further, various local offices are operated under the control of the center office whereby satisfactory service can be assured irrespective of the frequency of occurrence of a fault, thereby providing uniform establishment of the circuits regardless of the condition of the installation at the local office. By treating time slots as different purpose time slot groups, the administration of the communication circuit network can be made in terms of units of different purpose time slot groups; ease of administration and the capacity of the communication system are increased, thus decreasing the cost.

What is claimed is:

1. A time division multiplex communication system comprising:
    a set of loop shaped transmission line pairs for transmitting time division multiplexed signals via a first transmission line pair in a first loop direction and via a second transmission line pair in the opposite loop direction;
    a central office connected to starting ends and terminal ends of each said transmission line pair;
    and a plurality of local offices located at intermediate points of each said transmission line pair;
    said central office including means connected to the starting and terminal ends of said transmission line pair for transmitting and receiving signals therewith, and a processing means for assigning time slots of time division multiplexed channels of said transmission line pairs to data signals to be sent via the transmission line pairs and for sending an interoffice signal regarding said assignment of the time slots to said local offices;
    each of said local offices including access means for accessing the assigned time slots of said time division multiplexed channels of said transmission line pairs, and control means responsive to said interoffice signal sent from said central office for controlling said access means, whereby when a communication is made between two offices belonging to said loop, said processing means of the central office assigns a time slot to said offices between which said communication is made for causing the access means of said local offices to operate under control of said control means of the local office so as to form with said assigned time slots two route channels, one passing through a specific point on a transmission path provided by said transmission line pairs, while the other not passing through said specific point thereby performing interoffice communications through either one of said route channels under the control of either one of said processing means of the central office and said control means of the local office.

2. The time division multiplex communication system according to claim 1 wherein said interoffice communication is made through both of said two route channels.

3. The time division multiplex communication system according to claim 1 wherein the time slots of said time division multiplexed signals comprise a set of time slots for one frame synchronizing signal, a time slot for transmitting control signals between said central office and said local offices, and a time slot for a plurality of digital data signals, said set comprising one frame.

4. The time division multiplex communication system according to claim 1 wherein said processing means adapted to assign the time slots functions to select either one of said route channels as a channel to be used.

5. The time division multiplex communication system according to claim 1 wherein each of said control means of said local offices adapted to assign the time slots functions to select either one of said route channels as a channel to be used.

6. The time division multiplex communication system according to claim 1 wherein said processing means adapted to assign time slots comprises a different synchronizing signal generator which respectively generates a frame synchronizing signal to be combined with time division multiplexed signals on said transmission line pair, and another frame synchronizing signal to be combined with a data signal processed in an office.

7. The time division multiplex communication system according to claim 1 wherein said control means in each local office includes means responsive to the control signal sent from the central office for controlling said access means to extract and introduce data signals on a time slot assigned to said local office through said access means, and means for causing signals on time slots not assigned to said local office to pass through said access means without applying any processing.

8. The time division multiplex communication system according to claim 7 wherein said control signals sent from the central office to respective local offices are sent through said transmission line pairs together with data signals.

9. A time division multiplex communication system comprising:
    a plurality of loop transmission line pairs for transmitting time division multiplexed signals through first transmission lines in a first loop direction and through second transmission lines in the opposite loop direction;

a central office connected to starting and terminal ends of respective transmission line pairs; and a plurality of local offices disposed at intermediate points of said transmission line pairs;

said central office including means connected to respective starting and terminal ends of said transmission line pairs for transmitting and receiving signals therewith, and a processing means for assigning time slots of time division multiplexed channels of said transmission line pairs and for sending an interoffice signal regarding said assignment to said local offices;

each one of said local offices including access means for accessing the assigned slots of said time division multiplexed channels of said transmission line pairs, and means responsive to the interoffice signal sent from said central office for controlling the operation of said access means, whereby when a communication is made between two offices belonging to said loop, said processing means of the central office assigns one time slot to said offices between which said communication is made for causing the access means of corresponding local offices to operate under the control of said control means so as to form with said assigned time slots two route channels, one passing through a specific point on a transmission path provided by said transmission line pairs, while the other not passing through said specific point, thereby performing interoffice communications through either one of said route channels under the control of either one of said processing means of said central office and the control means of the local office.

10. The time division multiplexed communication system according to claim 1 or 9 wherein the time slots for the time division multiplexed signals are divided into a plurality of different purpose time slot groups each including a plurality of time slots, and said processing means of said central office assigns said different purpose time slot groups in accordance with predetermined functional office groupings.

11. The time division multiplex communication system according to claim 10 wherein each different purpose time slot group comprises a time slot block including adjacent and contiguous time slots of the time division multiplexed signals.

12. The time division multiplex communication system according to claim 9 wherein said means adapted to transmit and receive signals in said central office establishes cross connections between the starting end of the first loop direction transmission line of a first transmission line pair and the terminal end of the opposite loop direction transmission line of a second transmission line pair, between the terminal end of the opposite loop direction transmission line of said first transmission line pair and the starting end of the first loop direction transmission line of said second transmission line pair, between the terminal end of said first loop direction transmission line of said first transmission line pair, and the starting end of said opposite loop direction transmission line of said second transmission line pair, and between the starting end of said opposite loop direction transmission line of said first transmission line pair and the terminal end of said first loop direction transmission line of said second transmission line pair.

13. The time division multiplex communication system according to claim 12 wherein said cross connections are established by a switch matrix.

14. The time division multiplex communication system according to claim 1 or 9 or 12 or 13 wherein said sending and receiving means in said central office is connected to external communication lines in addition to said transmission line pair.

15. The time division multiplex communication system according to claim 14 wherein the access means in each local office is connected to the external transmission lines.

16. The time division multiplex communication system according to claim 14 wherein said external transmission lines are divided into first and second groups, and said means in said central office for transmitting and receiving signals comprises a switch matrix which independently establishes connections between the starting end of the first loop direction transmission line and the terminal end of the opposite loop direction transmission line connected by said switch matrix into states in synchronism with the operation of said switch matrix.

17. The time division multiplex transmission system according to claim 16 wherein said means in said central office adapted to transmit signals further comprises a time slot counter interposed between the starting and terminal ends of said first loop direction and opposite loop direction transmission lines and said external transmission lines, said time slot converter converting time slots which are different according to the transmission lines, said last mentioned transmitting and receiving ends being located on the other side of said point.

18. The time division multiplex communication system according to claim 15 wherein said access means in each local office includes a switch matrix which establishes connections between the sending end of the first loop direction transmission line and the receiving end of the opposite loop direction transmission line with said external transmission line, said transmitting and receiving ends being located on one side of a point at which said local office is inserted in said transmission pair, and between the receiving end of said first loop direction transmission line and the transmitting end of said opposite loop direction transmission line with said external transmission line with the external transmission line of said first group, between the terminal end of said first loop direction transmission line and the starting end of said opposite loop direction transmission line and the external transmission lines of said second group and between the starting and terminal ends of said opposite loop direction transmission line.

19. The time division multiplex transmission system according to claim 18 wherein said access means further comprises a time slot converter inserted between the transmitting end to the first loop direction transmission line as the receiving end from the opposite loop direction transmission line and the external transmission lines, said transmitting and receiving ends being located on one side of a point at which said local office is inserted in said transmission line pair and between the receiving end of said first loop direction transmission line and the transmitting end to said opposite loop direction transmission line, said last mentioned transmitting end being located on the other side of said point, and said time slot converter converting time slots which differ depending upon said transmission lines into states in synchronism with the operation of said switch matrix.

20. The time division multiplex communication system according to claim 1 wherein said means in said central office for transmitting and receiving signals includes means for generating a frame synchronizing signal for respective time slots of said time division multiplexed signals on said transmission line pairs, said frame synchronizing signal being combined with data signals, and wherein said access means in each local office comprises a detector for extracting a frame synchronizing signal and means controlled by said control means for interconnecting via said detector ends of said first loop direction transmission line and said opposite loop direction transmission line at the local offices on both sides of a section of said transmission line in which a failure occurred.

21. The time division multiplex communication system according to claim 1 or 20 wherein said processing means functions to reassign failure channels with time slots constituting the channels established through a faulty section.

* * * * *